(12) United States Patent
Kim et al.

(10) Patent No.: US 8,391,357 B2
(45) Date of Patent: Mar. 5, 2013

(54) METHOD AND APPARATUS FOR RECEIVING ENCODING DATA IN NON-REAL TIME AND REAL TIME IN A BROADCAST SIGNAL

(75) Inventors: Jin Pil Kim, Seoul (KR); Jong Yeul Suh, Seoul (KR); Jae Hyung Song, Seoul (KR)

(73) Assignee: LG Electronics Inc., Seoul (KR)

( * ) Notice: Subject to any disclaimer, the term of this patent is extended or adjusted under 35 U.S.C. 154(b) by 860 days.

(21) Appl. No.: 12/385,408

(22) Filed: Apr. 7, 2009

(65) Prior Publication Data

US 2009/0268806 A1 Oct. 29, 2009

Related U.S. Application Data

(60) Provisional application No. 61/043,103, filed on Apr. 7, 2008, provisional application No. 61/044,896, filed on Apr. 14, 2008, provisional application No. 61/056,838, filed on May 29, 2008.

(30) Foreign Application Priority Data

Apr. 6, 2009 (KR) .................. 10-2009-0029507

(51) Int. Cl.
*H04N 7/12* (2006.01)

(52) U.S. Cl. .................................... 375/240.01
(58) Field of Classification Search ......... 375/240.01
See application file for complete search history.

(56) References Cited

U.S. PATENT DOCUMENTS

| | | | |
|---|---|---|---|
| 2006/0233242 A1* | 10/2006 | Wang et al. | 375/240.08 |
| 2007/0091928 A1* | 4/2007 | Wee et al. | 370/474 |
| 2007/0223582 A1* | 9/2007 | Borer | 375/240.12 |
| 2009/0187960 A1* | 7/2009 | Lee et al. | 725/131 |

FOREIGN PATENT DOCUMENTS

| EP | 0 935 370 | 8/1999 |
|---|---|---|
| WO | WO 2007/024084 | 3/2007 |

* cited by examiner

*Primary Examiner* — Jay Patel
*Assistant Examiner* — Richard Torrente
(74) *Attorney, Agent, or Firm* — McKenna Long & Aldridge LLP

(57) ABSTRACT

A method of receiving a broadcasting signal in an apparatus for receiving the broadcasting signal, is disclosed. The method includes receiving a first encoding data descriptor describing first encoding data of contents having the first encoding data and second encoding data, in non-real time, receiving the first encoding data in non-real time, according to the first encoding data descriptor, and decoding the first encoding data received in non-real time and the second encoding data received in real time together, according to the first encoding data descriptor, and outputting the contents.

14 Claims, 23 Drawing Sheets

Recording of these parts must follow what Record Enable Field
in Enhancement Layer Description Data indicates

| Channel Identifier | Unique identification for physical tuning of the service |
| Program Identifier | |
| Base Layer data Identifier | Unique identification for program (event) in the Channel |
| Enhancement Layer data Identifier | |

FIG. 6

| No Recording |
|---|
| Buffering for Time-shift Allowed |
| Recording allowed with expiration date |
| Recording allowed with limited number of playback |
| Permanent Storage Allowed |

FIG. 7

| | Syntax | Bits | Format |
|---|---|---|---|
| | video_layer_info_table_section (){ | | |
| |    table_ID | 8 | Uimsbf |
| |    zero | 2 | Bslbf |
| |    reserved | 2 | Bslbf |
| |    section_length | 12 | Uimsbf |
| |    zero | 3 | Bslbf |
| |    protocol_version | 5 | |
| |    first_index | 8 | uimsbf |
| |    number_of_programs | 8 | uimsbf |
| |    for (i=0; i<number_of_programs; i++) { | | |
| |       reserved | 4 | '1111' |
| Channel identifier |       major_channel_number | 10 | uimsbf |
| |       minor_channel_number | 10 | uimsbf |
| |       channel_TSID | 16 | uimsbf |
| Program identifier |       program_number | 16 | uimsbf |
| |       source_id | 16 | uimsbf |
| |       reserved | 6 | '111111' |
| Base layer video identifier |       base_layer_video_PID | 13 | uimsbf |
| Enhancement layer video identifier |       enhancement_layer_video_PID | 13 | uimsbf |
| |       for (i=0; descriptors_count; i++) { | | |
| |          descriptor() | | |
| |       } | | |
| SVC enhancement layer descriptor is located |    } | | |
| |    for (i=0; i<N; i++) { | | |
| |       descriptor() | | optional |
| |    } | | uimsbf |
| |    CRC_32 | 32 | rpchof |
| | } | | |

FIG. 8

| Syntax | Bits | Format |
|---|---|---|
| SVC_enhancement_layer_descriptor ( ) { | | |
|     descriptor_tag | 8 | 0xBB |
|     descriptor_length | 8 | uimsbf |
|     reserved | 3 | '1111' |
|     enhancement_layer_video_PID | 13 | uimsbf |
|     enhancement_type | 4 | uimsbf |
|     video_width | 16 | uimsbf |
|     video_height | 16 | uimsbf |
|     frame_rate | 16 | uimsbf |
|     video_bit_rate | 16 | uimsbf |
|     record_enable_code | 4 | uimsbf |
|     record_attributes | 32 | uimsbf |
| } | | |

FIG. 14

| Syntax | Bits | Format |
|---|---|---|
| event_information_table_section(){ | | |
|     table_ID | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0;j<num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0; i<N;i++){ | | |
|             descriptor() | | |
|         } | | |
|     } | | |
|     CRC_32 | 32 | rpchof |
| } | | |

FIG. 15

| | Syntax | Bits | Format |
|---|---|---|---|
| | video_layer_service_table_section(){ | | |
| |   table_ID | 8 | Uimsbf |
| |   zero | 2 | Bslbf |
| |   reserved | 2 | Bslbf |
| |   section_length | 12 | Uimsbf |
| |   zero | 3 | Bslbf |
| |   protocol_version | 5 | |
| |   first_index | 8 | uimsbf |
| |   number_of_services | 8 | uimsbf |
| |   for (i=0; i<number_of_services; i++) { | | |
| |     reserved | 4 | '1111' |
| Channel identifier |     major_channel_number | 10 | uimsbf |
| |     minor_channel_number | 10 | uimsbf |
| |     channel_TSID | 16 | uimsbf |
| Program identifier |     program_number | 16 | uimsbf |
| |     source_id | 16 | uimsbf |
| NRT or RT service is informed |     service_type | 6 | uimsbf |
| |     stream_layer_type | 4 | uimsbf |
| Layer_type |     previous_schedule_override_flag | 1 | bslbf |
| PID value of transport packet of video stream |     service_stream_PID | 13 | uimsbf |
| |     transmission_start_time | 32 | uimsbf |
| |     transmission_end_time | 32 | uimsbf |
| |     for (i=0; descriptors_count; i++) { | | |
| Time information capable of receiving stream |       descriptor() | | |
| |     } | | |
| |   } | | |
| |   for (i=0; i<N; i++) { | | |
| Associated data descriptor is located File descriptor is also located if service_type is NRT |     descriptor() | | optional |
| |   } | | uimsbf |
| | } | | |

FIG. 16

| Syntax | Bits | Format |
|---|---|---|
| file_descriptor(){ | | |
|     descriptor_tag | 8 | 0xBB |
|     descriptor_length | 8 | uimsbf |
|     reserved | 3 | '1111' |
|     file_name | 16*8 | uimsbf |
|     file_id | 16 | uimsbf |
|     file_locator | 48 | uimsbf |
|     file_type | 8 | uimsbf |
|     file_size | 16 | uimsbf |
|     codec_type | 16 | uimsbf |
|     video_width | 16 | uimsbf |
|     video_height | 16 | uimsbf |
|     frame_rate | 16 | uimsbf |
|     run_time | 32 | uimsbf |
| } | | |

FIG. 17

| Syntax | Bits | Format |
|---|---|---|
| associated_data_descriptor ( ) { | | |
|     descriptor_tag | 8 | 0xBB |
|     descriptor_length | 8 | uimsbf |
|     reserved | 4 | '1111' |
|     associated_data_major_channel_number | 10 | uimsbf |
|     associated_data_minor_channel_number | 10 | uimsbf |
|     associated_data_channel_TSID | 16 | uimsbf |
|     associated_data_program_number | 16 | uimsbf |
|     associated_data_source_id | 16 | uimsbf |
|     reserved | 6 | '111111' |
|     associated_data_service_type | 6 | uimsbf |
|     associated_data_layer_type | 4 | uimsbf |
|     associated_data_transmission_start_time | 32 | uimsbf |
|     associated_data_transmission_end_time | 32 | uimsbf |
|     reserved | 3 | '111' |
|     associated_data_elementary_PID | 13 | uimsbf |
|     associated_video_width | 16 | uimsbf |
|     associated_video_height | 16 | uimsbf |
|     associated_frame_rate | 16 | uimsbf |
|     associated_data_bit_rate | 16 | uimsbf |
| } | | |

FIG. 18

| Syntax | Bits | Format |
|---|---|---|
| File_attribute_descriptor() | | |
| Descriptor_tag | 8 | |
| Descriptor_length | 8 | |
| File_type | 8 | Encapsulation type : TS, MP4, ES, ... |
| Media_type | 8 | Video only, audio only, video + audio, ... |
| for (i=0; i<num_of_media_type; i++) | | |
| { | | |
|   component_type[i] | 8 | Video, audio, graphic, ... |
|   codec_type [i] | 16 | MPEG-2, H.264, HE-AAC, ... |
|   profile_level_val [i] | 32 | Profile / level for each codec (if applicable) |
| } | | |
| Content_protection_flag | 1 | '1' if content protection is applied to the file<br>'0' otherwise<br>If content protection is applied, decryption key is required to play back this file |
| Service_protection_flag | 1 | '1' if service protection is applied<br>'0' otherwise<br>If service protection is applied, decryption key is required to receive (or download) the file |

METHOD AND APPARATUS FOR RECEIVING ENCODING DATA IN NON-REAL TIME AND REAL TIME IN A BROADCAST SIGNAL

This application claims the priority benefit of Korean Application No. 10-2009-0029507, filed on Apr. 6, 2009, which is hereby incorporated by reference as if fully set forth therein.

This application claims the benefit of U.S. Provisional Application No. 61/043,103, filed on Apr. 7, 2008, titled "METHOD OF STORING SCALABLE VIDEO SIGNAL", which is hereby incorporated by reference.

This application claims the benefit of U.S. Provisional Application No. 61/044,896, filed on Apr. 14, 2008, titled "SEPARATE TRANSMISSION OF SCALABLE VIDEO LAYEE USING COMBINATION OF REAL TIME AND NON REAL TIME SCHEMES", which is hereby incorporated by reference.

This application claims the benefit of U.S. Provisional Application No. 61/056,838, filed on MAY 29, 2008, titled "SEPARATE TRANSMISSION OF SCALABLE VIDEO LAYEE USING COMBINATION OF REAL TIME AND NON REAL TIME SCHEMES", which is hereby incorporated by reference.

BACKGROUND OF THE INVENTION

1. Field of the Invention

The present invention relates to a method of transmitting and receiving a broadcasting signal and an apparatus for receiving a broadcasting signal.

2. Discussion of the Related Art

Digital television (DTV) can provide various services in addition to video and audio services which are inherent functions of TV. For example, the DTV can provide an electronic program guide (EPG) or the like to users, and can provide contents via a real time or non-real time transport channel. In particular, an apparatus for receiving a broadcasting signal includes a mass storage device. In addition, since the apparatus is connected to the Internet for performing bi-directional communication or a data communication channel, the number of services which can be provided using the broadcasting signals has been significantly increased.

In such an environment, recently, a method of transmitting and receiving a broadcasting signal, which is capable of providing a real-time broadcasting service and a non-real-time broadcasting service, and an apparatus for receiving a broadcasting signal, which is capable of implementing the method, have been developed.

Meanwhile, as a possibility that a scalable video/audio coding scheme is employed as a next-generation broadcasting video codec for the viewing and the recoding of high-quality and high-effect video/audio data is increased, it is expected that various functions using the scalable video/audio coding scheme will be introduced. Conventionally, the limitation and the authority for the viewing and recording of high-quality video/audio data were not separately considered. In the current real-time terrestrial signal is free-to-air, no problem is generated in the viewing of the high-quality or high-resolution video/audio data if a receiver has capability for receiving the high-quality or high-effect video/audio data. However, various problems may be generated in the recording of the high-quality or high-effect video/audio data. For example, conventionally, in the case where high-quality video data is recorded, the quality of the data was graded down. In this case, an additional device such as a transcoder is further necessary. In the scalable video coding scheme, data coded according to video layers (base and enhancement layers) may be separately transmitted. In particular, the unauthorized recording and viewing of high-quality contents (e.g., enhancement layer data) by a unauthorized user need to be prevented.

SUMMARY OF THE INVENTION

Accordingly, the present invention is directed to a method of transmitting and receiving a broadcasting signal and an apparatus for receiving a broadcasting signal that substantially obviate one or more problems due to limitations and disadvantages of the related art.

An object of the present invention is to provide a method of transmitting and receiving a broadcasting signal and an apparatus for receiving a broadcasting signal, which are capable of efficiently providing a broadcasting service transmitted in real time and a broadcasting service transmitted in non-real time.

Another object of the present invention is to provide a an apparatus for receiving a broadcasting signal and a method of transmitting and receiving a broadcasting signal, which are capable of allowing only an authorized user to record or output high-quality contents coded by a coding scheme such as a scalable video coding (SVC) scheme or a multi-view video coding (MVC) scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving a broadcasting signal in an apparatus for receiving the broadcasting signal, is disclosed. The method includes receiving a first encoding data descriptor describing first encoding data of contents having the first encoding data and second encoding data, in non-real time, receiving the first encoding data in non-real time, according to the first encoding data descriptor and decoding the first encoding data received in non-real time and the second encoding data received in real time together, according to the first encoding data descriptor, and outputting the contents.

In another aspect of the present invention, the apparatus for receiving a broadcasting signal, is disclosed. The apparatus includes a reception unit configured to receive a first encoding data descriptor describing first encoding data of contents having the first encoding data and second encoding data and the first encoding data corresponding to the first encoding data descriptor in non-real time, and receive the second encoding data in real time, a broadcasting descriptor decoder configured to decode the received first encoding data descriptor and a control unit configured to decode the first encoding data and the second encoding data according to the decoded first encoding data descriptor, combine the decoded first encoding data and second encoding data, and output the contents.

The first encoding data descriptor may include an identifier of a channel for receiving the first encoding data, a program identifier, and an identifier of the second encoding data. The first encoding data descriptor may include storage permission information of the first encoding data.

The storage permission information may be any one of information indicating that the storage of the first encoding data is not permitted, information indicating that the temporary storage for a time-shift function of the first encoding data is permitted, information indicating that the storage of the first encoding data is permitted during a limited time, information indicating that the storage of the first encoding data is permitted by a limited number of playback events, and information indicating that the permanent storage of the first encoding data is permitted.

The first encoding data descriptor may include a reception start time of the first encoding data and a reception end time of the first encoding data. The first encoding data descriptor may further include a file attribute descriptor describing an encoding scheme of the first encoding data. The file attribute descriptor may include a media type of the first encoding data, a component type of the media, a codec type of the first encoding data, and information indicating whether or not the first encoding data is encrypted. The first encoding data descriptor may further include an identifier of the first encoding data, location information capable of receiving the first encoding data, and the second encoding data descriptor. The second encoding data descriptor may further include channel information capable of receiving the second encoding data, a reception start time of the second encoding data and a reception end time of the second encoding data.

The first encoding data may be enhancement layer data according to scalable video coding (SVC) scheme, and the second encoding data may be base layer data according to the scalable video coding (SVC) scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a view showing an example of storage permission information;

FIG. 7 is a view in detail showing a program descriptor including storage permission information of an enhancement layer of a high-quality program;

FIG. 8 is a view showing a detailed example of a descriptor describing enhancement layer data;

FIG. 14 is a view showing an event information table (EIT) which may include an associated data descriptor;

FIG. 15 is a view showing a table section as a detailed example describing a layer data descriptor;

FIG. 16 is a view showing a detailed example of an NRT descriptor;

FIG. 17 is a view in detail showing an associated data descriptor;

FIG. 18 is a view showing a descriptor describing the attribute of a file;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A service transmitted in real time (RT) refers to on-air service which is received and is immediately displayed by a receiver, and a service transmitted in non-real time (NRT) refers to a service which is received and displayed by a receiver at a specific time point, not in real time. The non real-time (NRT) service refers to a service for transmitting a program using a portion of a broadcasting channel and, more particularly, a redundant bandwidth of a broadcasting channel. This service may be used for a service for playing back a program after storage or a service for viewing stored data in real time, rather than real-time viewing.

For example, a receiver may receive and store data transmitted in non real-time (NRT) in a storage medium, and play back the stored data and the received data selectively or together when data associated with the stored data is received or when a specific time is reached. A service transmitted in real-time refers to a service which is received and is output in real-time, like a current terrestrial broadcasting signal. For example, a broadcasting station may transmit a real-time service and transmit video supplementary information such as news clips, weather information, advertisement, Push video on demand (VOD), an Electronic Program Guide (EPG), or an enhancement video layer using an non real-time (NRT) service.

Meanwhile, the unauthorized recording and duplication of high-resolution contents according to a scalable video coding (SVC) scheme (or a multi-view video coding scheme (MVC)) need to be prevented. The following embodiments may divide a base layer and an enhancement layer of video/audio data according to the SVC scheme into a real-time (RT) service and an non real-time (NRT) service and transmit and receive the services, such that the unauthorized recording and duplication of high-quality video are prevented. The detailed example thereof is as follows.

Although, hereinafter, an example of transmitting video/audio data according to the SVC scheme is described, an example of transmitting video data of each view according to the MVC scheme may be employed. That is, different data filmed by a plurality of cameras at a plurality of view points may be transmitted in non real-time (NRT) such that a user can view data at a desired view point. Alternatively, a receiver having capability for processing three-dimensional (3D) data receives 3D-associated supplementary information data transmitted in non real-time (NRT) and applies the stored 3D-associated supplementary information when two-dimensional data is broadcasted in the future, such that the broadcast can be viewed using the receiver as 3D data instead of 2D data.

Figure 1:
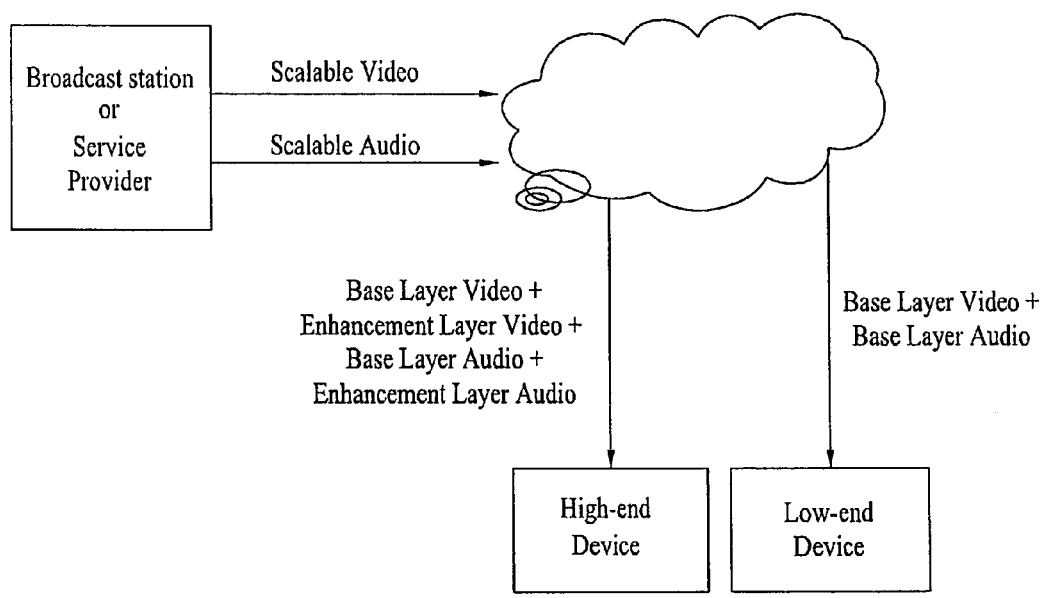
FIG. 1 is a conceptual diagram of the transmission and reception of scalable video/audio data.

FIG. 1 is a conceptual diagram of the transmission and reception of scalable video/audio data. Scalable video/audio data may be transmitted as real-time (RT) service data and non real-time (NRT) service data.

A broadcasting station or a service provider may divide audio/video data coded by the SVC scheme according to layers and transmit the data. For example, the broadcasting station may transmit base layer data and enhancement layer data as the real-time (RT) service and the non real-time (NRT) service, respectively.

A high-end device may combine the base layer data and enhancement layer data received in real-time (RT) or non real-time (NRT), and output the combined data. The high-end device may receive any one of the base layer data and the enhancement layer data as the real-time (RT) service data, receive the other thereof as the non real-time (NRT) service data, combine the two pieces of service data, and output the combined data.

However, a low-end device which cannot process data of the SVC scheme may output only the base layer data.

Figure 2:
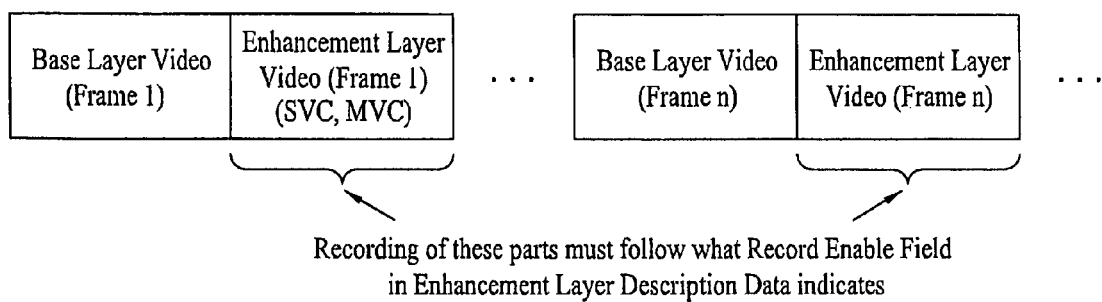
FIG. 2 is a view showing the structure of a broadcast stream according to a scalable video coding (SVC) scheme.

FIG. 2 is a view showing the structure of a broadcast stream according to a SVC scheme. For example, in the case where a video stream according to the SVC scheme is transmitted, base layer data and enhancement layer data may be transmitted in a state of being multiplexed in the unit of frames. An enhancement layer video frame 1 may be transmitted after a base layer video frame 1 is transmitted, and an enhancement layer video frame 2 may be transmitted after a base layer video frame 2 is transmitted. Data coded by the MVC scheme may be transmitted in a similar manner. The base layer data or the enhancement layer data may be transmitted in non real-time (NRT) in advance and stored in a receiver. Enhancement layer data corresponding to the base layer data transmitted in non real-time (NRT) or base layer data corresponding to the enhancement layer transmitted in non real-time (NRT) may be received in real-time (RT). Accordingly, when the real-time (RT) service is received, the real-time (RT) service may be combined with the stored non real-time (NRT) service such that high-quality contents are output. The operation for storing the non real-time (NRT) service or the operation for combining the non real-time (NRT) service and the real-time (RT) service may be provided to the user of a specific receiver such that the user is conditionally authorized to the viewing and the storage of the high-quality contents.

Figure 3:
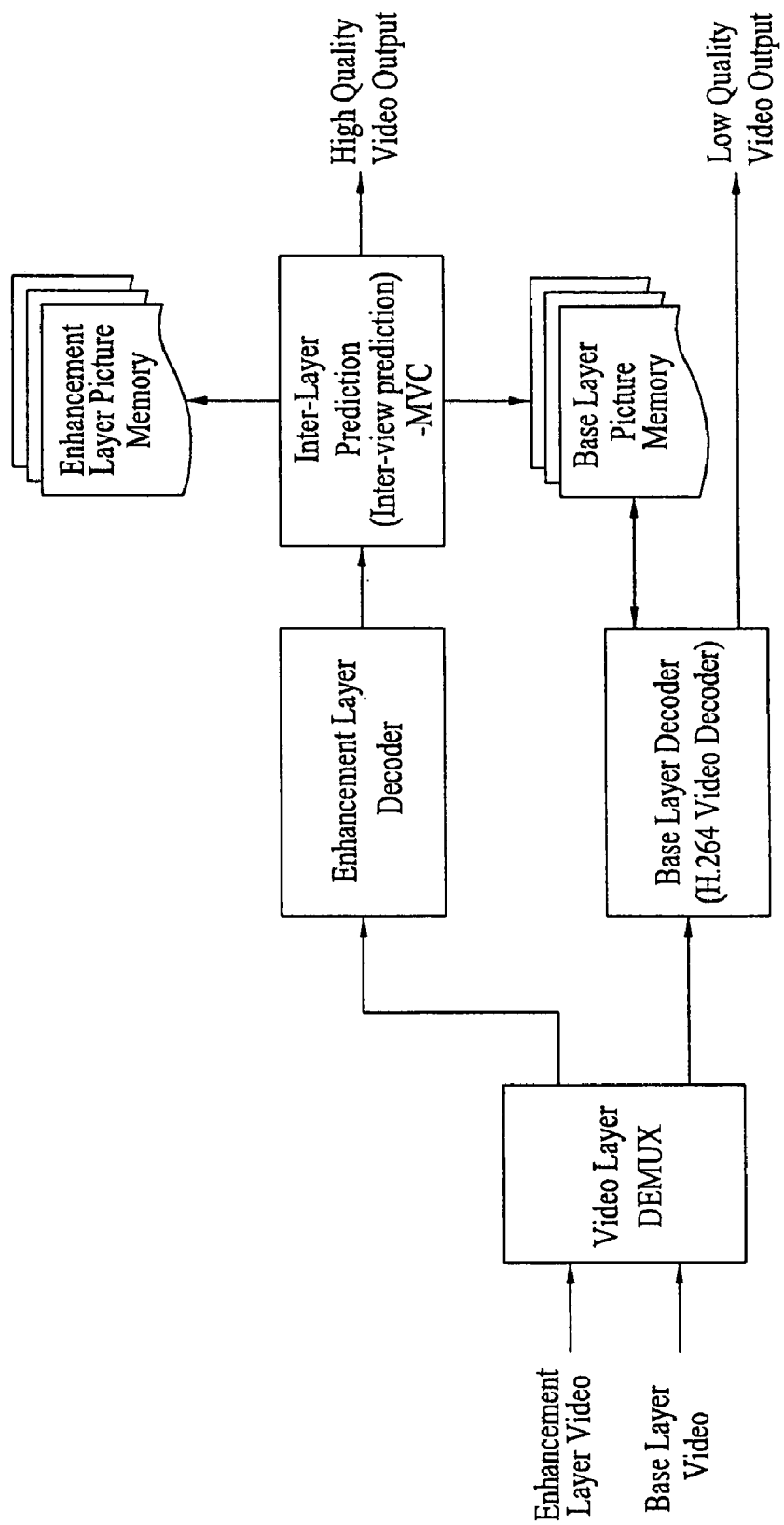
FIG. 3 is a view showing an embodiment of a decoder for decoding SVC or multi-view video coding (MVC) data.

FIG. 3 is a view showing an embodiment of a decoder for decoding SVC or MVC data. Since the coding principles of the SVC and MVC data are identical, only the operation of the decoder of the SVC data will be described in this embodiment.

When data in which base layer data and enhancement layer data are multiplexed is input to a demultiplexer, the demultiplexer may divide the data into the base layer data and the enhancement layer data and output the divided data. A base layer decoder decodes the base layer data and stores the decoded data in a base layer picture memory. An enhancement layer decoder decodes the enhancement layer data and stores the decoded enhancement layer data in an enhancement layer picture memory.

An interlayer prediction unit (or an inter-view prediction unit) outputs high-quality video data using the base/enhancement layer data (or multi-view data) stored in the base layer picture memory and the enhancement layer picture memory.

Since a receiver which cannot process the enhancement layer data includes only the base layer decoder, only the base layer data may be decoded and low-quality video data may be output.

Data of Contents may be encoded to first encoding data and second encoding data by encoding schemes, and then the first encoding data and the second encoding data may be decoded according the playback quality of the contents and be combined, or only any one of the first encoding data and the second encoding data may be decoded. Such an encoding/decoding scheme may include a SVC or MVC scheme with respect to the video data. Hereinafter, for convenience of description, an example of separately transmitting the base layer data and the enhancement layer data coded by the SVC scheme in real-time (RT) or non real-time (NRT), combining the separately transmitted data and outputting the combined data will be disclosed.

First, as a first embodiment, information for controlling the enhancement layer data of the program to be selectively stored may be transmitted or received. Then, the receiver may selectively store the enhancement layer data of the program and control unauthorized recording of high-quality video/audio data.

In addition, as a second embodiment, the base layer data or the enhancement layer data may be separately transmitted in real-time (RT) or non real-time (NRT) such that information for allowing only an authorized user to combine two pieces of layer data is transmitted and received. Accordingly, high-quality or high-effect video/audio data may be selectively provided to an authorized user.

In order to combine the base layer data or the enhancement layer data transmitted in real-time (RT) or non real-time (NRT), information describing a relationship between the base layer data and the enhancement layer data is necessary. For example, when the base layer data is transmitted in non real-time (NRT) and is stored in the receiver and the enhancement layer data is transmitted in real-time (RT), information indicating when the stored base layer data may be output together with the enhancement layer data of which program may be transmitted and received.

In the case where the base layer data or the enhancement layer data is transmitted as the non real-time (NRT) service, an NRT data descriptor is transmitted and received earlier than or simultaneously with the non real-time (NRT) service. The NRT data descriptor may include a descriptor of real-time (RT) data information capable of being combined with the non real-time (NRT) data. A RT data descriptor may be transmitted separately from the NRT data descriptor. In addition, the stored non real-time (NRT) data and the real-time (RT) data are combined using the RT data descriptor. The real-time (RT) data or the non real-time (NRT) data may become the base layer data or the enhancement layer data. Accordingly, high-quality video/audio data may be played back via the channel for transmitting the real-time (RT)/non real-time (NRT) data.

Hereinafter, the first embodiment and the second embodiment will be sequentially described.

Figures 4, 5:
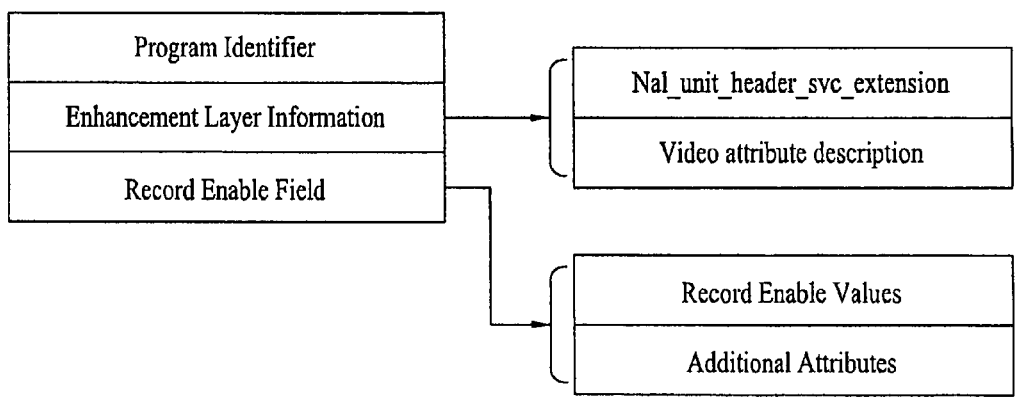
FIG. 4 is a view showing a program descriptor including storage permission information of enhancement layer data.
FIG. 5 is a view showing an example of an enhancement layer descriptor including storage permission information of enhancement layer data.

FIG. 4 is a view showing a program descriptor including storage permission information of enhancement layer data. In the case where the base layer data or the enhancement layer data of a program is transmitted, a program descriptor including storage permission information of the enhancement layer data of the program may be first transmitted and received. The program descriptor may include a channel identifier, a program identifier, a base layer data identifier and an enhancement layer data identifier.

The channel identifier indicates the identifier of a channel capable of receiving a program. In the case where the receiver is a terrestrial or cable broadcasting receiver, the channel identifier may become the identifier of a physical channel or a logical channel. For example, the channel identifier may include information such as a carrier frequency, a channel transmitting subscriber identification (TSID), a program number and a source ID. In the case where the receiver receives the program using the Internet like Internet protocol television (IPTV), Internet protocol (IP) address information or flute session information may become the channel identifier. The receiver may tune to a service location using the channel identifier.

The program identifier indicates the identifier of a program or an event of service data transmitted using the channel, the IP address or the session indicated by the channel identifier. The program or the event is an element included in one service and may include video, audio and data broadcasting data. The program identifier may include a program number, a major/minor channel identifier, a content id and an event id.

The base layer data identifier or the enhancement layer identifier includes information capable of identifying the base layer data or the enhancement layer data included in a high-quality program. For example, in the case of an IP/user datagram protocol (UDP), the base layer or the enhancement layer may be identified using a port number of a UDP header. The base layer data identifier or the enhancement layer data identifier may be identified by a packet identifier (PID) or a new stream type. The more detailed embodiment of FIG. 4 will be described later.

The storage permission information of the enhancement layer data may be transmitted such that the high-resolution video/audio data is prevented from being freely duplicated.

FIG. 5 is a view showing an example of an enhancement layer descriptor including storage permission information of enhancement layer data. The storage permission information of the enhancement layer data includes a program identifier, enhancement layer attribute information and a record enable field.

The program identifier indicates a program identifier associated with the enhancement layer data. The enhancement layer attribute information is attribute information defined in the SVC and may include information for referring to coding information when the receiver combines data coded by the SVC scheme. For example, the enhancement layer attribute information of video data may include nal_unit_header_svc_extension defined in ISO/IEC 14496-10 annex G and a video attribute descriptor. The video attribute description may become, for example, information such as a scalability type, a video frame rate or resolution when the enhancement layer data is decoded.

The storage permission information indicates information indicating whether or not the enhancement layer data of the SVC data can be stored. The detailed example thereof will be described with reference to the following figures.

Accordingly, the storage permission information of the enhancement layer data of the data coded by the SVC scheme can be transmitted and received, and the receiver stores the enhancement layer data according to the storage permission information. Therefore, it is possible to prevent the unauthorized duplication of the contents of the SVC scheme. The enhancement layer descriptor may have a format of a table section or an extensible markup language (XML) and the detailed example thereof will be described later.

FIG. 6 is a view showing an example of storage permission information. The storage permission information indicates information for controlling the storage of the enhancement layer data by the receiver.

In this example, "no recording" is information for disallowing the receiver to store the enhancement layer data. "Buffering for time-shift allowed" allows the receiver to store the enhancement layer data only for a time-shift function. The time-shift function refers to a function for temporarily storing received data and then outputting the stored data so as to output a video signal later than the general case where received data is immediately decoded and output. Accordingly, a receiver which cannot process SVC data or does not have the time-shift function cannot store the enhancement layer data according to this information.

"Recording allowed with expiration date" indicates a record enable field for allowing the receiver to store the enhancement layer data only during a limited period.

"Recording allowed with limited number of playback" indicates information for allowing the receiver to store the enhancement layer data only until a limited number of playback events is reached and deleting the stored enhanced layer data when the limited number of playback events is exceeded.

"Permanent storage allowed" indicates information for allowing the receiver to store the enhancement layer data.

FIG. 7 is a view in detail showing a program descriptor including storage permission information of an enhancement layer of a high-quality program. The program descriptor has a format of a table section. The enhancement layer descriptor may be transmitted in a state of being included in a virtual channel table (VCT) or a program map table (PMT). In this figure, the table section of the program descriptor is called video_layer_info_table_section. A table_ID field indicates the identifier of this table and may include a zero field and a reserved field. A section_length field indicates the length of the section, and a protocol_version field includes version information of the table section after a zero field.

A first_index field indicates the index of an enhancement layer data unit described in this table section. In the case where one or more enhancement layer data units are transmitted, the first_index field may indicate the index information of the data units by values of 1 to 255.

A number_of_programs field indicates the number of programs corresponding to the enhancement layer data.

With respect to each program, information about a channel for transmitting each program may be defined using a major_ channel_number field, a minor_channel_number field and a channel_TSID field. At least one of these three fields may correspond to the channel identifier of FIG. 4.

In addition, a program_number field and a source_id field become the identifier of each program. At least one of these two fields may correspond to the program identifier of FIG. 4.

In addition, a base_layer_video_PID field and an enhancement_layer_video_PID field indicate transmission PIDs of the base layer data and the enhancement layer data, respectively. These two fields may become the base layer video identifier and the enhancement layer video identifier of FIG. 4, respectively.

As the enhancement layer descriptor, a descriptor describing the enhancement layer data may be included in this table section.

FIG. 8 is a view showing a detailed example of a descriptor describing enhancement layer data.

A descriptor_tag field and a descriptor_length field indicate the identifier and the length of this descriptor, respectively.

An enhancement_layer_video_PID field is the identifier of a packet for transmitting the enhancement layer data. The enhancement_layer_video_PID field may correspond to the enhancement_layer_video_PID described in the video_layer_info_table_section which is the program descriptor.

An enhancement_type field may indicate a value such as spatial scalability, temporary scalability or signal-to-noise-ratio (SNR) (quality) scalability. The receiver can know the scalability type of the enhancement_layer_data using this value.

A video_width field and a video_height field indicate the width and the height of high-quality video data played back on a screen, respectively. A frame_rate field and a video_bit_rate field indicate the frame rate and the video bit rate of described video data, respectively.

A record_enable_code field indicates the storage permission information of the enhancement layer data and may become the values shown in FIG. 6.

A record_attributes field may control a stored stream according to the record_enable_code field in the case where the receiver stores the enhancement layer data. For example, the record_attributes field may indicate an expiration date or time in the case where the record_enable_code field is "recording allowed with expiration date". Alternatively, the record_attributes field may relatively represent a storable date. That is, if this field has a value of n, the receiver may delete the enhancement layer data after n days from a time point when the enhancement layer data is stored.

If the record_enable_code has a value corresponding to "recording allowed with limited number of playback", the record_attributes field may indicate the number of playback events of the stream.

If the record_enable_code has a value corresponding to "buffering for time-shift allowed" and the record_attributes field has a value of 0, the receiver performs a time-shift function within an allowable time range. Alternatively, if the record_enable_code has a value corresponding to "buffering for time-shift allowed", the record_attributes field may indicate a time (for example, in the unit of seconds) for performing the time-shift function by the receiver.

Figure 9:
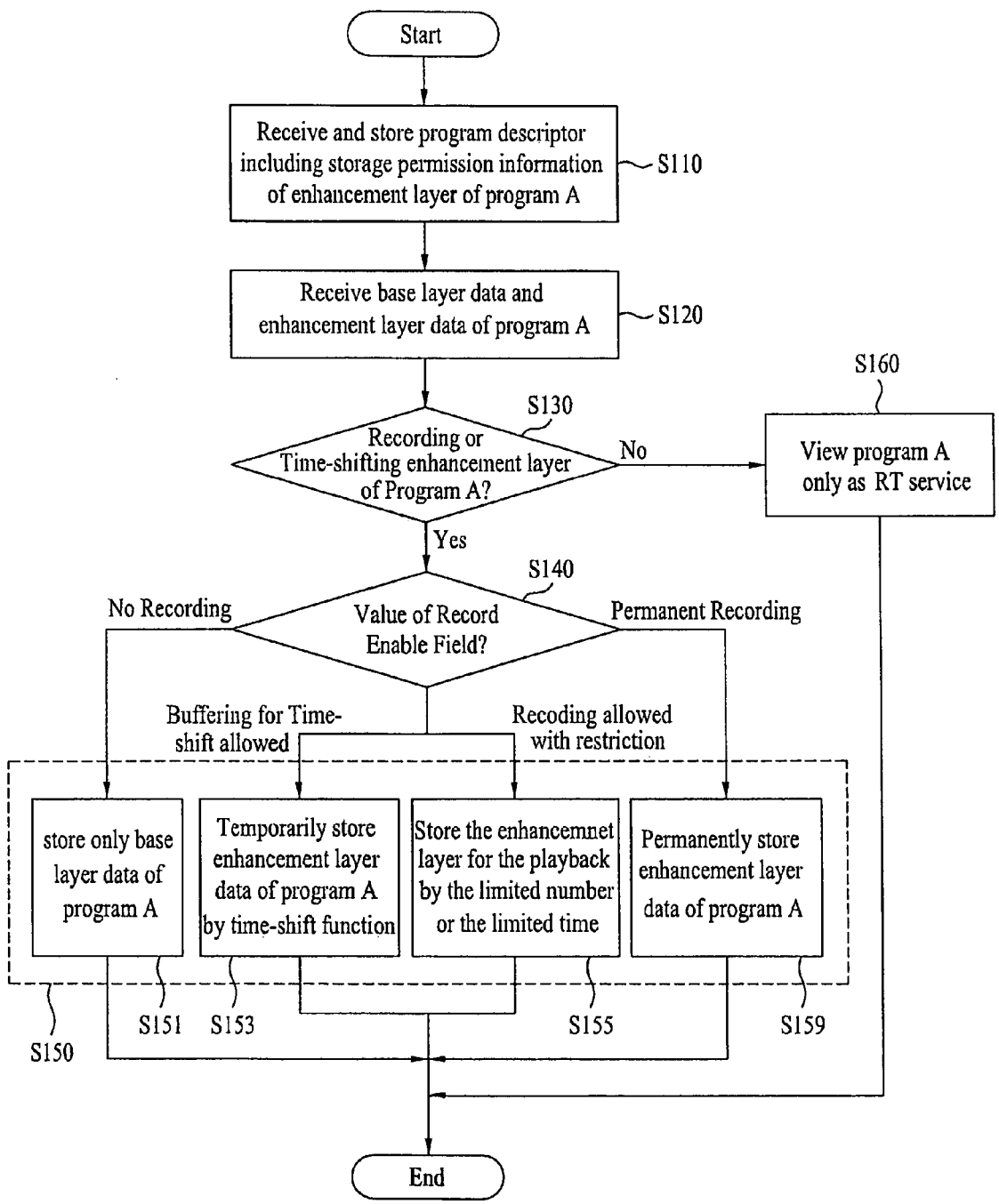
FIG. 9 is a view showing a method of receiving a broadcasting signal according to an embodiment of the present invention.

FIG. 9 is a view showing a method of receiving a broadcasting signal according to an embodiment of the present invention.

A program descriptor including storage permission information of enhancement layer data of a program A is received (S110). The program descriptor including the storage permission information of the enhancement layer data of the program A may be received in a state of being included in a table section (FIG. 7) or IP packet.

The base layer data and the enhancement layer data of the program A are received (S120). If the enhancement layer data of the program A may be stored according to the program descriptor (yes, in a step S130), the value of the storage permission information (record enable field) of the enhancement layer data is determined (S140).

The enhancement layer data of the program A is stored according to the storage permission information of the enhancement layer data of the program A (S150). The example of the storage permission information may have the values shown in FIG. 6.

For example, if the storage permission information does not permit the storage of the enhancement layer data, the enhancement layer data of the program A is not stored, but only the base layer data is stored (S151).

Alternatively, the storage permission information may be information which permits only the temporary storage of the enhancement layer data of the program A. In this case, the enhancement layer data of the program A is temporarily store for a time-shift function (S153).

If the storage permission information is information for limiting the playback of the enhancement layer data by the limited number or the limited time, the enhancement layer data of the program A is stored until the playback is performed by the limited number or the limited time (S155).

If the storage permission information is information for recording the enhancement layer data without limitation, the enhancement layer data is permanently stored (S157).

If the enhancement layer of the program A cannot be stored (no in the step S130), the enhancement layer data associated with the program A is not stored. Accordingly, only when the program A is viewed in real-time (RT), high-quality video data can be viewed (S160).

The base layer or the enhancement layer may be transmitted in real-time (RT) or non real-time (NRT). In this case, the storage permission information of the enhancement layer data may be also included in an enhancement layer data descriptor. This embodiment will be described later.

Accordingly, the storage permission information for selectively storing the enhancement layer data of the program A is stored such that only an authorized user or a receiver including a specific function can play back and store a program provided as a high-quality service.

Figure 10:
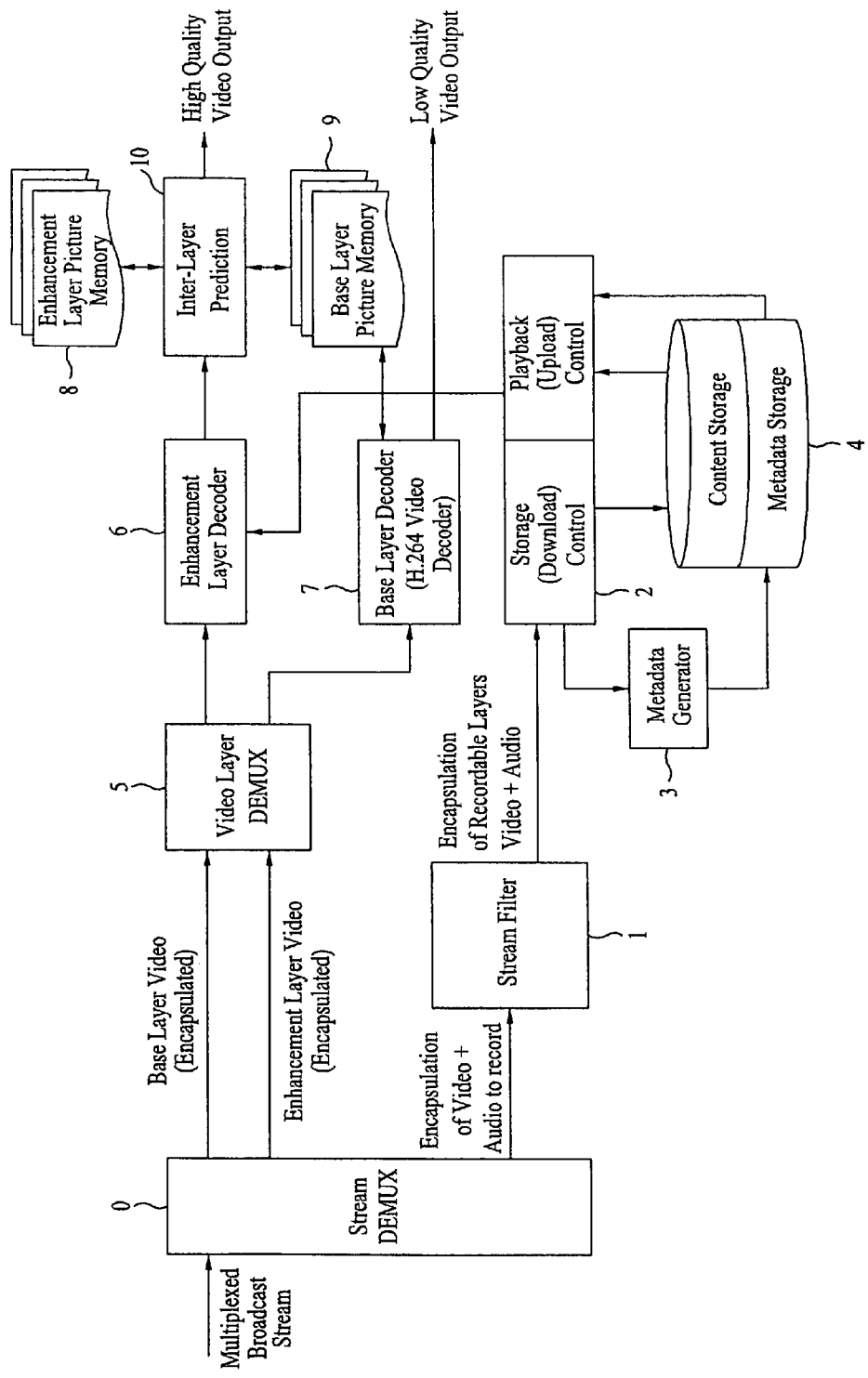
FIG. 10 is a view showing an apparatus for receiving a broadcasting signal according to an embodiment of the present invention.

FIG. 10 is a view showing an apparatus for receiving a broadcasting signal according to an embodiment of the present invention. Although, in the apparatus for receiving the broadcasting signal, an example of storing SVC enhancement layer data transmitted in non real-time (NRT) using storage permission information and outputting a high-quality video signal is disclosed, the same scheme is applicable to audio data or data coded by the MVC scheme. The apparatus for receiving the broadcasting signal according to the embodiment of the present invention includes a stream demultiplexer 0, a stream filter 1, a storage control unit 2, a metadata generator 3, a storage unit 4, a video demultiplexer 5, a first decoder 6, a second decoder 7, a first video memory 8, a second video memory 9, and a video combiner 10.

The stream demultiplexer 0 may receive a multiplexed broadcast stream, divide the received broadcast stream into a stream to be stored and a stream to be output, and output the divided streams. For example, in order to store the received high-quality video signal without change, the video demultiplexer 5 divides and outputs base layer data and enhancement layer data.

The first decoder 6 decodes the enhancement layer data, and the second decoder 7 decodes the base layer data. For example, the first decoder 6 and the second decoder 7 may decode video data configured by a video algorithm such as an H.264 algorithm. The first video memory 8 stores the decoded enhancement layer data, and the second video memory 9 stores the decoded base layer data. The video combiner 10 may combine the base layer data and the enhancement layer data using inter-layer predication and output high-quality video data. If the video data of the base layer decoded by the second decoder 7 is output, low-quality video data is output. The first decoder 6 and the second decoder 7 decode the base layer data and the enhancement layer data transmitted in real-time (RT) such that high-quality video data is displayed.

Although not shown in the figure, the stream demultiplexer 0 may receive a program descriptor describing the enhancement layer data of the program A to be received and played back in non real-time (NRT) or in real-time (RT) and demultiplex the program descriptor. The examples of the program descriptor are shown in FIGS. 4, 5, 7 and 8. The program descriptor may be decoded and stored in the storage unit 4 or may be stored in a separate program descriptor storage unit (not shown).

In the case where the enhancement layer data is transmitted in non real-time (NRT), the stream demultiplexer 0 may demultiplex a stream transmitted in non real-time (NRT) according to the program descriptor. For example, the data transmitted in non real-time (NRT) may be identified by a specific PID, and may be identified by a port number or the like of a UDP header if it is transmitted by an IP/UDP stream. The stream filter 1 described herein may selectively filter the enhancement layer data based on the PID of the packet transmitted in non real-time (NRT) according to an enhancement layer descriptor of the program descriptor.

That is, the program A which is transmitted in real-time (RT) and is composed of only the base layer is played back in real-time (RT) using the video demultiplexer 5 and the second decoder 7, and an enhancement layer descriptor and enhancement layer data associated with a program B which is not currently broadcasted may be transmitted together with the program A. The enhancement layer descriptor and the enhancement layer data are stored in the storage unit 4 via the stream filter 1 and the storage control unit 2. When the data is stored in the storage unit 4, metadata of the enhancement layer data may be generated and stored in a metadata storage unit of the storage unit 4. If the base layer data of the program B is broadcasted later, the receiver may combine the stored enhancement layer data and the base layer which is being broadcasted and play back the program with high quality.

The storage control unit 2 stores the enhancement layer data in the storage unit 4 according to the storage permission information of the program descriptor. For example, the storage control unit 2 may store a packet corresponding to the enhancement layer data using the PID of the enhancement layer data. The storage permission information is shown in FIG. 6. The enhancement layer data may not be stored, may be limitedly stored or may be permanently stored according to the storage permission information. If the storage is limited, the data may be temporarily stored, stored only during a specific period, or played back by a specific number, in order to perform a time shifting function.

At this time, the metadata generator 3 may separately generate and store metadata of the enhancement layer data in the storage unit 4. The metadata may include information such as a playback time point (a start time or an end time) of the enhancement layer data or a video data frame or a playback section corresponding to a specific time point. The metadata generator 3 may generate metadata in the unit of transport packets and store the generated metadata.

The enhancement layer data may be uploaded using a descriptor of layer data obtained from a broadcasting signal and be decoded together with the base layer data. The detailed example thereof will be described later.

The storage control unit 2 may upload the enhancement layer data from the storage unit 4 using the program descriptor or the metadata. The uploaded enhancement layer data may be input to and be decoded by the first decoder 6 according to the storage permission information.

The enhancement layer data received in non real-time (NRT) according to the described program descriptor or the storage permission information may be combined with the base layer data transmitted in real-time (RT) or non real-time (NRT) such that high-quality video data is output.

Although the process of processing the video data is described, the stream demultiplexer 0 may demultiplex, for example, the stream data in which video data and audio data are encapsulated. The demultiplexed video/audio data may be stored in the encapsulation units.

Hereinafter, an embodiment of transmitting the base layer data and the enhancement layer data in a state of being divided into real-time (RT) data and non real-time (NRT) data and preventing the duplication of a high-quality program will be described.

A conventional pay-per-view (PPV) program limits the use of a service using a service protection method such as a Conditional Access System (CAS). However, in this method, the unauthorized duplication of the service may be allowed if the CAS algorithm is destroyed.

Here, an embodiment of transmitting base layer data of a program to be protected in real-time (RT) and transmitting enhancement layer data in non real-time (NRT) or transmitting the base layer data in non real-time (NRT) and transmitting the enhancement layer data in real-time (RT) so as to transmit the service will be described. Since a high-quality program can be obtained by combining the base layer data and the enhancement layer data, it is possible to limit the viewing and the duplication of the high-quality program.

Hereinafter, in the case where any one of the base layer data or the enhancement layer data is transmitted in non real-time (NRT) or in real-time (RT), information describing that layer data is transmitted. In addition, an embodiment of transmitting a layer data descriptor in real-time (RT) or non real-time (NRT) so as to combine with data transmitted in real-time (RT) or non real-time (NRT) will be described. The layer data descriptor may be transmitted according to Internet Protocol (IP) or may be transmitted in the form of a table section such as Program System Information (PSI)/Program System Information Protocol (PSIP). If the layer data descriptor is transmitted according to IP, the layer data descriptor can be accessed according to a Service Discovery Protocol (SDP) like Electronic Service Guide (ESG) or Electronic Program Guide (EPG) transmission. Here, an example of transmitting the layer data descriptor in the form of the table section will be described.

Figure 11:
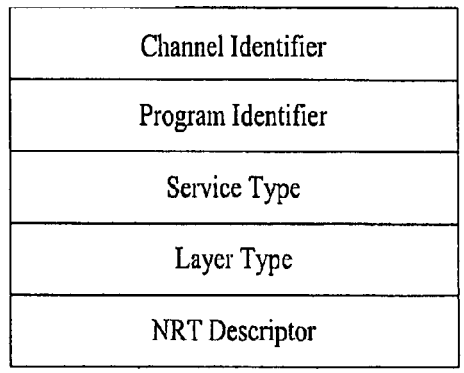
FIG. 11 is a view showing a layer data descriptor.

FIG. 11 is a view showing a layer data descriptor. The layer data descriptor may describe specific layer data transmitted as real-time (RT) service data or non real-time (NRT) service data. For convenience of description, for example, the case where the specific layer data is transmitted as the non real-time (NRT) service data will be described.

Accordingly, the layer data descriptor described herein may describe base layer data or enhancement layer data transmitted as the non real-time (NRT) service data. In detail, examples of the layer data descriptor may include a channel identifier, a program identifier, a service type, a layer type and an NRT descriptor.

The channel identifier indicates the identifier of a channel for receiving non real-time (NRT) data. In the case where the receiver receives a service via the internet like an IPTV, the channel identifier may become IP address information or flute session information. The receiver may receive the service from a service location identified using this information.

The program identifier indicates the identifier of an event or a program of service data transmitted using a channel, an IP address, or a session displayed by the channel identifier. The program or the event is an element included in one service and may include video, audio and associated data. For example, the program identifier may include a program number, a major/minor channel identifier, a content id, and an event id.

The service type indicates whether or not the data to be described is real-time (RT) service data or non real-time (NRT) service data. Since an example in which base layer data or enhancement layer data is transmitted as the non real-time (NRT) service is disclosed, the service type may indicate the non real-time (NRT) service.

The layer type indicates whether data transmitted according to the service type is base layer data or enhancement layer data.

The layer data descriptor may include an NRT descriptor. The NRT descriptor may describe non real-time (NRT) service data identified by the layer data descriptor in detail. This will be described in detail.

Figure 12:
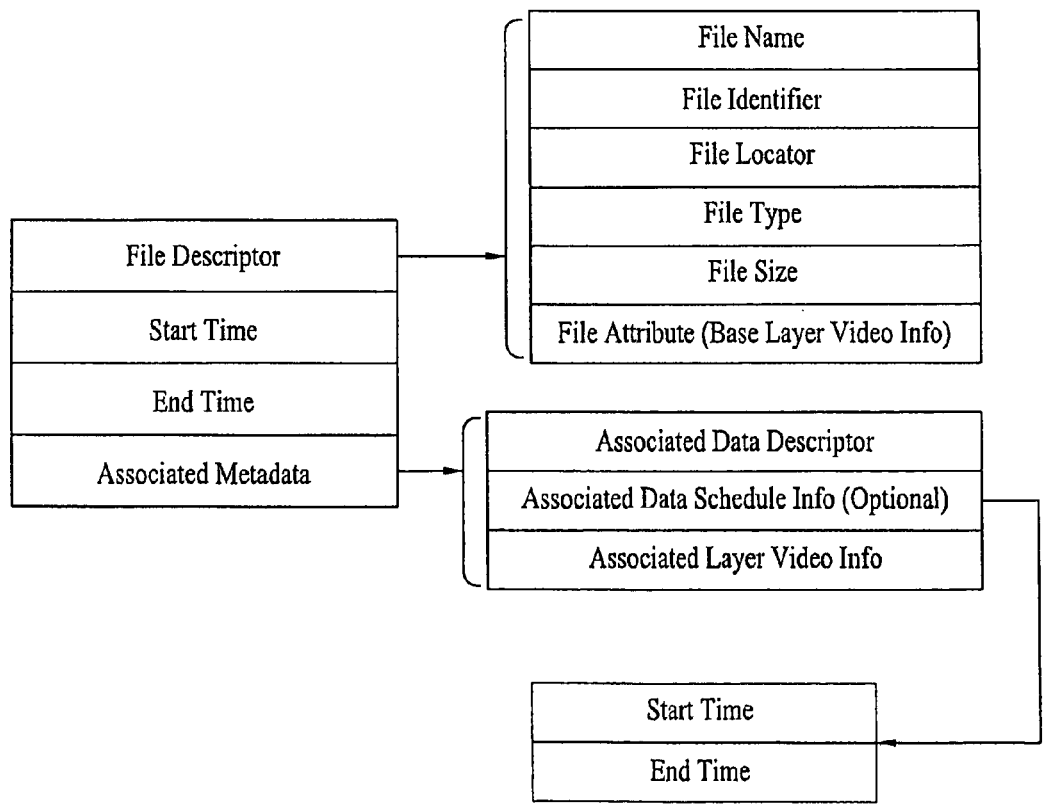
FIG. 12 is a view showing information included in a non-real-time (NRT) descriptor of FIG. 11.

FIG. 12 is a view showing information included in the NRT descriptor of FIG. 11. The NRT descriptor may describe a file descriptor, a start time, an end-time and associated metadata.

The file descriptor includes information about a file identifier, a file identifier, a file locator, a file type, a file size, a file attribute of a file transmitted in non real-time (NRT).

The file name indicates the file name of the file transmitted in non real-time (NRT). The file identifier does not indicate the identifier of a broadcast stream, but indicates the identifier of the file. The file name may be used as information for identifying a program.

The file locator is a location where the file transmitted in non real-time (NRT) can be received, and may include information such as IP packet transmitted by a broadcasting signal. The file type may indicate whether the file is an audio file or a video file. The file size may indicate the size of the file transmitted in non real-time (NRT). The file attribute is attribute information of data transmitted in non real-time (NRT), and may include information about a frame rate, video resolution, a bitrate and a codec kind if the data is the video data.

The start time and the end time respectively indicate a transmission start time and a transmission end time of the file transmitted in non real-time (NRT). If the start time and the end time are used, it is determined when the non real-time (NRT) file can be received. The NRT descriptor may include information about a start time and a duration, instead of the start time and the end time.

The associated metadata may describe data associated with the file transmitted in non real-time (NRT). That is, if the non real-time (NRT) file is base layer data, the associated metadata indicates metadata of enhancement layer data transmitted in non real-time (NRT) or real-time (RT) and, if the non real-time (NRT) file is enhancement layer data, the associated metadata indicates metadata of base layer data transmitted in non real-time (NRT) or real-time (RT). The associated metadata may include schedule information of the associated data.

The associated metadata may include an associated data descriptor, associated data schedule information and detailed information of associated data (associated layer video information).

The associated data descriptor may include a descriptor describing enhancement layer data or base layer data which is associated data of data transmitted in non real-time (NRT). This will be disclosed in the following detailed embodiment.

The associated metadata includes time information of the associated data of non real-time (NRT) data, and may include, for example, transmission start and end times of data transmitted in real-time (RT). Alternatively, the associated metadata may include a transmission start time and a duration of the real-time (RT) data.

The detailed information of the associated layer data (associated layer information) may additionally include detailed information of other real-time (RT) data.

The associated metadata or the associated data descriptor may be included in another PSI/PSIP table section or layer data descriptor, instead of the NRT descriptor.

Figure 13:
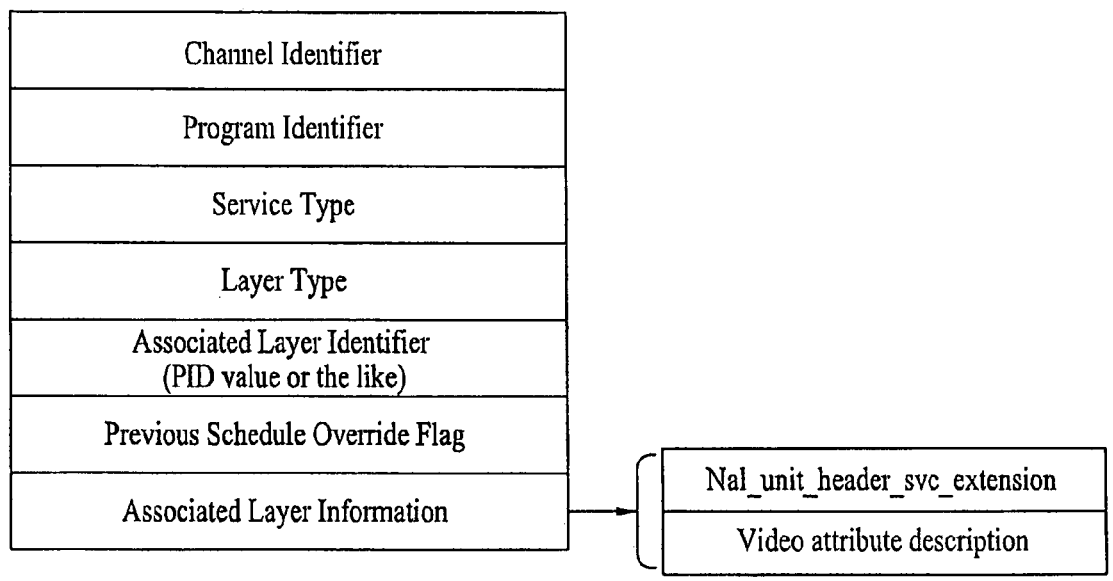
FIG. 13 is a view showing a detailed example of an associated data descriptor.

FIG. 13 is a view showing a detailed example of the associated data descriptor. If the layer data descriptor includes base layer data (or enhancement layer data) transmitted in non real-time (NRT), the associated data descriptor may describe enhancement layer data (or base layer data) transmitted in real-time (RT). The layer data descriptor may describe base layer data (or enhancement layer data) which is real-time (RT) data, and the associated data descriptor may describe enhancement layer data (or base layer data) which is non real-time (NRT) data.

The associated data descriptor may include a channel identifier, a program identifier, a service type, a layer type, an associated layer identifier, a previous schedule override flag, and associated layer information.

The channel identifier is the identifier of a channel for transmitting real-time (RT) data associated with non real-time (NRT) data, and the program identifier indicates the program identifier of the real-time (RT) data.

The service type indicates the service type of the real-time (RT) data. For example, the service type may indicate whether the data is a video service or an audio service.

The layer type indicates whether the real-time (RT) data is base layer data or enhancement layer data.

The associated layer identifier indicates the transmission identifier of data according to the layer type. For example, the associated layer identifier may have an IP address and a port number if the associated layer data is transmitted according to the IP and may have a PID value if the associated layer data is transmitted according to MPEG-2 TS.

The previous schedule override flag is information for determining whether or not previous schedule information (that is, the start time/end time in the above-described example) is overridden if the associated data descriptor is continuously transmitted. Alternatively, the previous schedule override flag may be valid if the associated data descriptor (or the associated metadata) is transmitted separately from the layer data descriptor or the NRT descriptor.

For example, the schedule information of the associated data (base or enhancement layer data) may be transmitted in a state of being included in the layer data descriptor, or the schedule information of real-time (RT) data associated with non real-time (NRT) data may be transmitted in a state of being included in the NRT descriptor. In this case, it may be indicated whether the schedule information of the transmitted layer data descriptor or the schedule information of the associated data descriptor (or the associated metadata) is used.

In more detail, it is assumed that the schedule information capable of receiving second layer data associated with first layer data is transmitted in a state of being included in information describing the first layer data. In this case, the associated data descriptor (or the associated metadata) describing the second layer data may be transmitted in a state of being included in a table such as an EPG an ESG having schedule information different from the above-described schedule information and another PSIP.

Accordingly, this associated data descriptor (or the associated metadata) may be matched with the schedule information included in the EPG, the ESG or the PSIP. The previous schedule override flag may indicate which of two pieces of schedule information is used for allowing the receiver to receive the second layer data.

For example, if the previous schedule override flag of the associated data descriptor is set to 0, the start and end times included in the associated data descriptor may be set to the reception start and end times of the second layer data, respectively. If the previous schedule override flag of the associated data descriptor is set to 1, the schedule information of the second associated data descriptor may be ignored and the schedule information included in the EPG, the ESG and the PSIP may be used for the second layer data reception time. That is, if the previous schedule override flag is set to 1, the start time and the end time included in the second layer data descriptor received in advance are updated to the start time and the end time included in the EPG, the ESG and the PSIP. The previous schedule override flag may indicate whether or not the reception schedule information of the associated data is updated. This will be described in detail later with reference to FIGS. 14 and 20.

The associated layer information may include nal_unit_header_svc_extension, which is SVC-associated encoding information defined in ISO/IEC 14496-10 annex, and a video attribute descriptor, if the associated layer data is video data. For example, the video attribute descriptor may include information such as a scalability type, a video frame rate and resolution, in the case where the associated layer data is decoded.

FIG. 14 is a view showing an event information table (EIT) which may include the associated data descriptor.

A table_id field (8 bits) indicates the identifier of the EIT section. A section_syntax_indicator (1 bit) indicates that the EIT uses the MPEG long-form syntax.

A private_indicator field (1 bit) is set to 1 in the PSIP.

A reserved field (2 bits) is a reserved region which is set to 11.

A section_length field (12 bits) indicates the length of the EIT section.

A source_id field (16 bits) indicates the identifier of a source associated with the EIT.

A reserve field (2 bits) is a reserved region which is set to 11.

A version_number field (5 bits) indicates the version of the table section, and the version_number field value is changed when the contents of the table are changed.

A current_next_indicator field (1 bit) indicates whether the EIT section is currently or next applied.

A section_number field (8 bits) indicates the number of sections in which event information is transmitted, that is, the serial number of the section. This value is increased from 0 one by one as the section is increased.

A last_section_number field (8 bits) indicates the last section number of the table section.

A protocol_version field (8 bits) indicates the protocol version of this table section.

A num_events_in_section field (8 bits) indicates the number of events included in the table section.

A reserved field (2 bits) is a reserved region which is set to 11.

An event_id field (16 bits) indicates the identifier of the event to be described.

A start_time field (40 bits) indicates the start time of the event in a Universal Time Coordinated (UTC).

An ETM_location field (2 bits) indicates whether or not an extended text table (ETT) text is applied to a current event.

A length_in_seconds field (20 bits) indicates the duration of the event in seconds.

A title_length field (8 bits) indicates the length of a next string.

A title_text field ( ) indicates the structure of a string for encoding the title of the event.

A reserved field (4 bits) indicates a reserved region having 4 bits.

A descriptors_length indicates the length of the following descriptors.

The above-described NRT descriptor or associated data descriptor may be included in descriptor( ) such that the layer data of the event according to the event identifier is described.

The EIT includes the identifier of the event, and that event may be identified by the start time (start time field) and the length (length_in_seconds field) of that event. If the EIT includes the associated data descriptor, the receiver may update the schedule information to the start time field and the length_in_seconds field of the EIT according to the previous schedule override flag value of the associated data descriptor, although the schedule information is included in the NRT descriptor in advance. That is, the time information of the event included in the EIT may be used as the reception schedule information of the base layer data or the enhancement layer data. The receiver may update the schedule information to the time information included in the EPG or the ESG information or the PSIP such as the EIT. Alternatively, in the case where the associated data descriptor is transmitted several times, the schedule information of the associated data descriptor which is transmitted later may be used.

FIG. 15 is a view showing a table section as a detailed example describing layer data descriptor. Here, the table section describing the layer data is called video_layer_service_table_section( ).

A table_id field indicates the identifier of the layer data descriptor table.

A section_length field indicates the length of the layer data descriptor table section. A protocol_version field includes the version information of the layer data descriptor table section.

A first_index field indicates the index of a layer data unit described by this table section and may have a value of 1 to 255. A number_of_services field indicates the number of pieces of layer data described.

A number_of_programs indicates the number of programs corresponding to the base or enhancement layer data to be described.

With respect to the base or enhancement layer data, a major channel number, a minor channel number and a channel TSID correspond to the identifiers of the channels for delivering the layer data.

A program_number field and a source_id field are the identifiers of the program including the layer data, and may correspond to the program identifier of FIG. 11.

A service_type field indicates whether the described layer data is non real-time (NRT) service data or RT service data.

A stream_layer_type field indicates whether the described data is base layer data or enhancement layer data, and corresponds to the layer_type of FIG. 11.

A previous_schedule_override_flag field corresponds to the above-described previous schedule override flag. The receiver may determine whether or not the schedule information in which the layer data is transmitted is overridden using this field value.

A service_stream_PID field indicates the PID of the transport packet in which the base or enhancement layer data is transmitted.

A transmission_start_time field and a transmission_end_time field indicate the transmission start time and the transmission end time of the base or enhancement layer data, respectively.

As the descriptor, the associated data descriptor of FIG. 13 may be located or the NRT descriptor may be located.

FIG. 16 is a view showing a detailed example of the NRT descriptor. Here, the NRT descriptor is called a file descriptor. The file_descriptor includes the information described with reference to FIG. 12.

A descriptor_tag and a descriptor_length indicate the identifier and the length of the file_descriptor, respectively.

A file_name indicates the name of the file described, and a file_id indicates the identifier of the file. A file_locator is location information capable of receiving the file, which, for example, may describe an IP address using 32 bits of 48 bits and describe a port number using 16 bits. A file_type indicates the type of contents, that is, indicates whether the data transmitted by the file is audio data or video data.

A file_size indicates the size of the file, and a codec_type indicates a coding algorithm for coding/decoding the file. For example, H.264, MPEG-2 or SVC enhancement video may correspond to the codec_type. A video_width and a video_height respectively indicate the width and the height of the video displayed on a screen by that video data if the file includes the video data.

A frame_rate indicates the video frame rate of the video data, a run_time indicates a time consumed when the video stream is played back from beginning to end in seconds.

This file descriptor may be included in the PSI/PSIP such as a PMT or a VCT in addition to the above-described layer data descriptor.

FIG. 17 is a view in detail showing the associated data descriptor.

As described above, the associated data descriptor includes information describing enhancement layer data with respect to base layer data and includes information describing base layer data with respect to enhancement layer data. That is, in the case where the base and enhancement layer data is independently transmitted, complimentary layer data of one layer data is described. For example, in the case where information describing or announcing a base layer video stream of a specific program using layer data descriptor (Video Layer Service Table (VLST)) is received by the receiver, information about an enhancement layer video stream corresponding thereto may be described by the associated data descriptor.

For example, when the base layer video of the program A is a stream B and the enhancement layer video is a stream C, the receiver receives first layer data descriptor a including the announcement information of the stream B. In addition, the announcement information of the stream C can be acquired using the associated data descriptor included in the first layer data descriptor a.

In addition, the announcement information of the stream C may be received using second layer descriptor b. At this time, in the case where schedule information different from information included in the announcement information of the stream B is included in the second layer data descriptor b, the previous_schedule_override_flag is set to "1". Then, the receiver may update the announcement information of the stream. C by referring to the second layer descriptor b.

Hereinafter, the fields will be described in detail.

A descriptor_tag field and a descriptor_length field indicate the identifier and the length of the associated data descriptor, respectively.

An associated_data_major_channel field and an associated_data_minor_channel field indicate a major channel and a minor channel in which the associated data is transmitted, respectively.

An associated_data_channel_TSID field indicates the identifier of a transport stream in which a channel for transmitting the associated_data is transmitted.

An associated_data_program_number field indicates the program number of the associated_data. An associated_data_source id field indicates the identifier of the source of the associated_data.

The associated_data_service_type field is the service type of the associated_data and indicates the detailed service type such as a video service or an audio service.

An associated_data_layer_type field may indicate whether the associated_data is base layer data or enhancement layer data.

An associated_data_transmission_start_time field indicates the transmission start time of the associated_data, and an associated_data_transmission end_time field indicates the transmission end time of the associated_data. The end time may be changed to the transmission duration of the associated_data.

An associated_data_elementary_PID field indicates the identifier of a packet for transmitting an elementary stream included in the associated data. An associated_data video_width field and an associated_data_video_height field indicate the width and the height displayed on a screen in the case where the associated_data is video data, respectively.

An associated_frame_rate field and an associated_data_bit_rate field may describe the frame rate and the bitrate of the associated_data, respectively.

FIG. 18 is a view showing a descriptor describing the attribute of a file. The descriptor describing the attribute of the file describes the attribute of a file or layer data received in non real-time (NRT) or real-time (RT) such that it is determined whether or not the file or the layer data received by the receiver in non real-time (NRT) or RT can be played back by the receiver.

A descriptor_tag and a descriptor_length may be the identifier and the length of this descriptor, respectively.

A file type indicates the attribute of the file transmitted in non real-time (NRT) or real-time (RT). For example, the file transmitted in non real-time (NRT) or real-time (RT) may have the attributes such as TS, MPEG-4, ES or IP datagram.

A media_type is the type of the media of the file transmitted in non real-time (NRT) or real-time (RT) and may have, for example, the media type such as video only, audio only, video and audio, or data.

The attribute of the layer data may be described by the number of media types.

A component_type indicates the type of the component included in the media of each file. For example, the components included in the media may include video, audio and data.

A codec_type is a coding/decoding type of the media and may be a video coding scheme or an audio coding scheme such as MPEG-2, H.264 or HE-AAC.

A profile_level_val indicates a value for identifying the profile or the level for each coding scheme.

A content_protection_flag is a value indicating whether or not a protection algorithm is applied to the contents included in the file. If the content_protection_flag is 1, the content protection algorithm is applied, and, if the content_protection_flag is 0, the content protection algorithm is not applied. If the content protection algorithm is applied, a decryption key may be required to play back the contents.

A service_protection_flag indicates whether or not a service protection algorithm is applied. For example, if this flag is 1, the service protection algorithm is applied. If the service protection algorithm is applied, a decryption key is required to receive or download the file.

Figure 19:
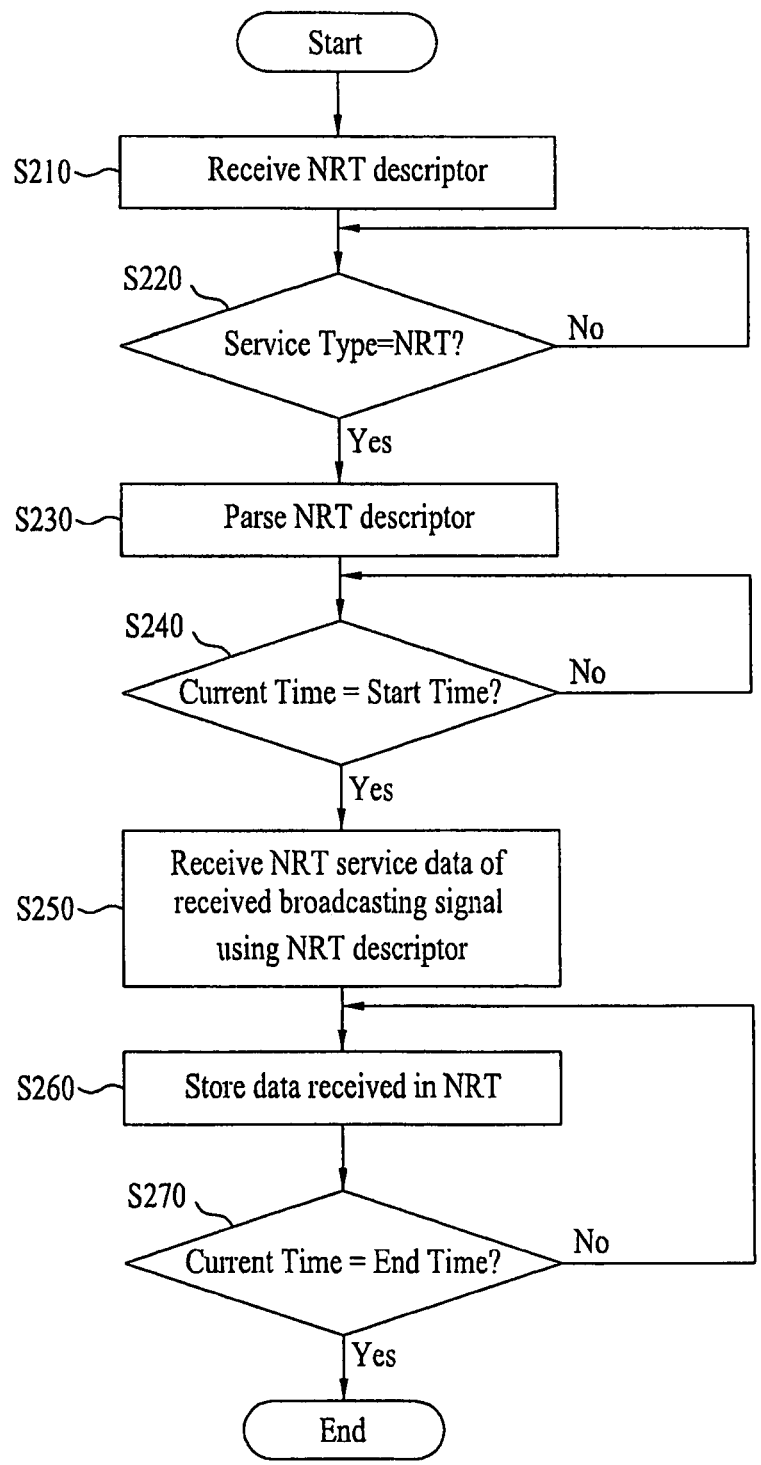
FIG. 19 is a view showing a method of receiving base layer data as NRT service data using an NRT descriptor according to an embodiment of the present invention.

FIG. 19 is a view showing a method of receiving specific layer data transmitted in non real-time (NRT) using an NRT descriptor, that is, layer data descriptor, according to an embodiment of the present invention.

First, the NRT descriptor is received (S210). The NRT descriptor may be included in the layer data descriptor and the detailed example thereof is shown in FIG. 16.

In the case where the service type of the data described by the layer data descriptor corresponds to a non real-time (NRT) service (S220), the NRT descriptor is parsed (S230).

If the current time is the start time described in the NRT descriptor (S240), non real-time (NRT) service data in the received broadcasting signal is received using the information included in the NRT descriptor (S250).

The file received as non real-time (NRT) data is stored (S260). The non real-time (NRT) data may be base layer data or enhancement layer data.

The non real-time (NRT) data is stored until the current time reaches the end time of the descriptor of the non real-time (NRT) data (S270).

Accordingly, the base layer data or the enhancement layer data included in the broadcasting signal is received and stored using the NRT descriptor in the layer data descriptor.

The user's receiver which can receive a high-quality service may output high-quality media by combining the stored base layer data or enhancement layer data with enhancement layer data or base layer data received in real-time (RT).

Figure 20:
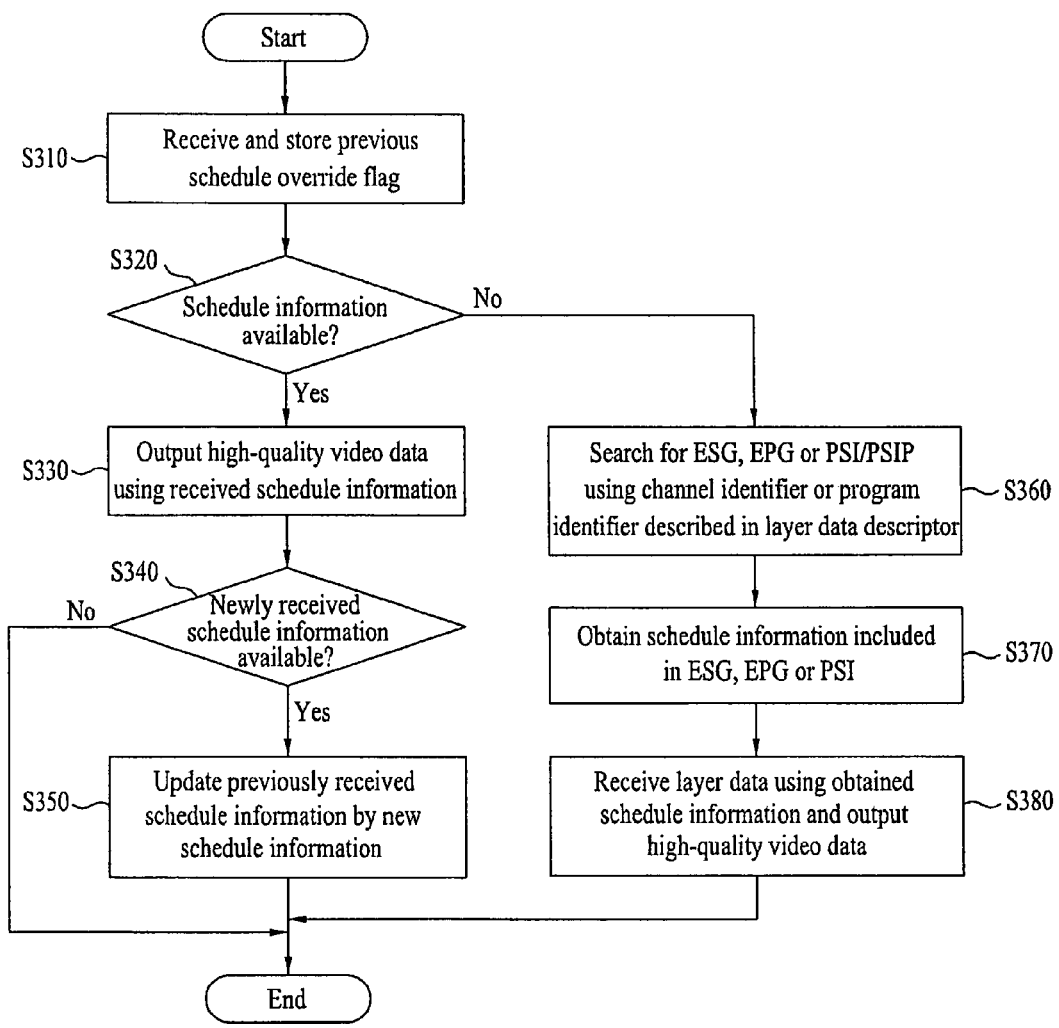
FIG. 20 is a view showing a method of updating schedule information using a previous schedule override flag included in an associated data descriptor or associated metadata according to an embodiment of the present invention.

FIG. 20 is a view showing a method of updating schedule information using a previous schedule override flag included in an associated data descriptor or associated metadata according to an embodiment of the present invention.

The descriptor or the layer descriptor including the schedule information is received and stored (S310). The schedule information of second layer data associated with a first layer may be included in the layer data descriptor describing the first layer data or the layer data descriptor describing the second layer data, or may be included in the NRT descriptor or the associated data descriptor included in the layer data descriptor.

It is determined whether or not the stored schedule information is available using the previous schedule override flag included in the received descriptor or layer data descriptor (S320). For example, if the schedule information different from the stored schedule information is included in a PSIP table, an EPG or an ESG, the schedule information received and stored in the step S310 may not be used.

Accordingly, if the previous schedule override flag indicates that the current schedule information is available (yes in the step S320), the second layer data is received using the schedule information included in the received layer data descriptor, and the first layer data and the second layer data are SVC-decoded so as to output high-quality video data (S330).

Meanwhile, the schedule information may be repeatedly transmitted with respect to the specific layer data or the schedule information transmitted in advance may be changed. Accordingly, it needs to be checked which of plural pieces of schedule information is updated.

Accordingly, it is determined whether or not the previous schedule override flag is set to 1 in the newly received descriptor or layer data descriptor (that is, it is determined whether or not the newly received schedule information is available and the previous schedule information is overridden (S340).

If the previous schedule override flag is set to 1 in the newly received descriptor or layer data descriptor, the previously received schedule information is ignored and the schedule information is updated to the start time and the end time of the newly received schedule information (S350).

If the schedule information which is received and stored is not available (no in the step S320), an ESG, an EPG or a PSI/PSIP table section is searched for using the channel identifier or the program identifier described in the descriptor or the layer data descriptor including the schedule information (S360).

The schedule information included in the ESG, the EPG or the PSI is obtained (S370).

The second layer data is received using the obtained schedule information and high-quality video data is output using the received second layer data (S380).

Figure 21:
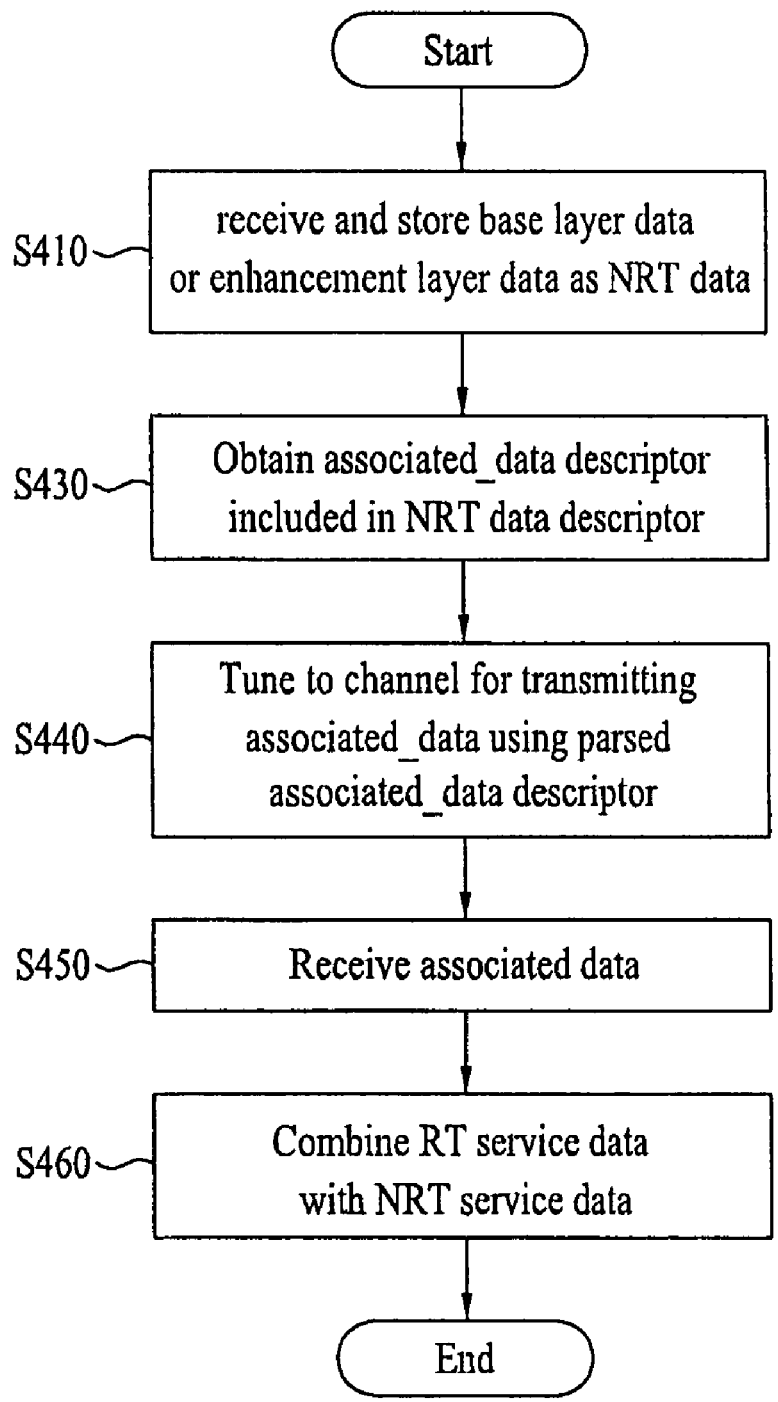
FIG. 21 is a view showing a method of receiving a broadcasting signal including NRT service data and real-time (RT) service data according to an embodiment of the present invention.

FIG. 21 is a view showing a method of receiving a broadcasting signal including data transmitted in non real-time (NRT) or real-time (RT), according to an embodiment of the present invention.

Any one of base layer data or enhancement layer data is received and stored in non real-time (NRT) (S410). The non real-time (NRT) data may be identified using a reception channel, a reception time, and receivable contents fields from layer data descriptor or the NRT descriptor included in the layer data descriptor.

An associated data descriptor associated with the non real-time (NRT) data is obtained from the information describing the non real-time (NRT) data (S430). The associated data descriptor is shown in FIG. 17.

A channel for transmitting the associated data is tuned using the parsed associated data descriptor (S440).

The associated data including the enhancement layer data or the base layer data associated with the base layer data or the enhancement layer data stored as the non real-time (NRT) service data is received in real-time (RT) (S450).

The stored non real-time (NRT) service data and the real-time (RT) service data are combined and output (S460). When the base layer data is transmitted as the non real-time (NRT) service data and the enhancement layer data is transmitted in real-time (RT), the base layer data and the enhancement layer data may be combined and output.

Figure 22:
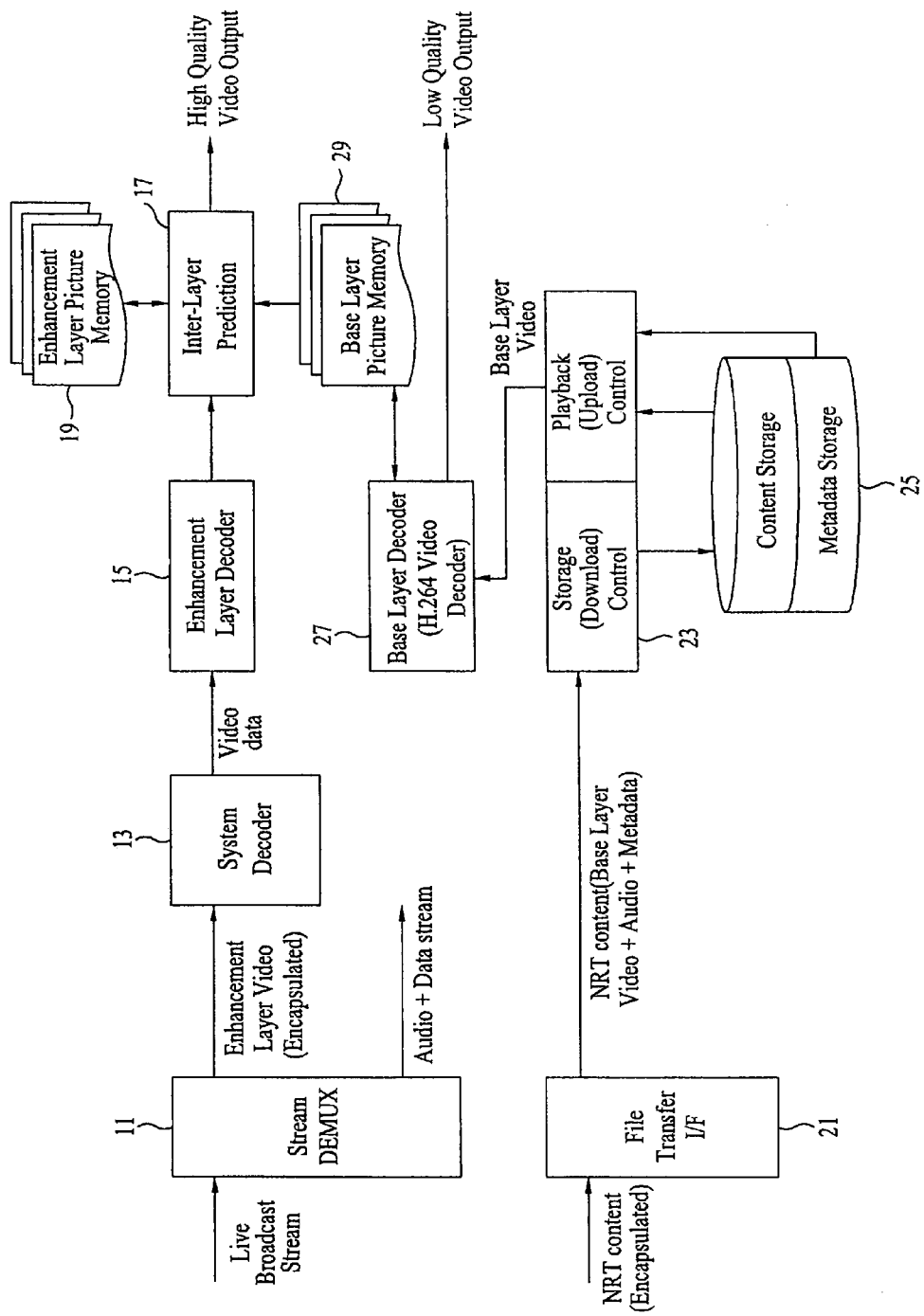
FIG. 22 is a view showing an apparatus for receiving a broadcasting signal according to an embodiment of the present invention.

FIG. 22 is a view showing an apparatus for receiving a broadcasting signal according to an embodiment of the present invention. The apparatus for receiving the broadcasting signal may receive enhancement layer data in real-time (RT), receive base layer data in non real-time (NRT), decode the two pieces of layer data together, and output a high-quality video signal.

The apparatus for receiving the broadcasting signal according to the embodiment of the present invention includes a stream demultiplexer 11, a system decoder 13, a first decoder 15, a first memory 19, a file filter 21, a storage control unit 23, a storage unit 25, a second decoder 27, a second memory 29 and a video combiner 17.

The stream demultiplexer 11, the system decoder 13, the first decoder 15 and the first memory 19 may process data transmitted in real-time (RT), and the file filter 21, the storage control unit 23, the storage unit 25, the second decoder 27 and the second memory 29 may process data transmitted in non real-time (NRT).

The apparatus for receiving the broadcasting signal according to the embodiment of the present invention may receive a table section including an NRT descriptor or layer data descriptor before data transmitted in non real-time (NRT) is received, and obtain information about non real-time (NRT) data including the reception time of the non real-time (NRT) data in advance. In addition, real-time (RT) data associated with the non real-time (NRT) data can be obtained as the associated data descriptor.

The file filter 21 may filter a file including non real-time (NRT) data. The non real-time (NRT) data file may be a file in which base layer data, audio data and metadata of the base layer data are encapsulated. The metadata may include playback information of the non real-time (NRT) data. The metadata may be extracted from the encapsulated file and be stored in a metadata storage unit of the storage unit 25.

The storage control unit 23 may store the received non real-time (NRT) data file in the storage unit 25 and store the non real-time (NRT) data file using the layer data descriptor or the metadata. Although not shown in the figure, a metadata generator for generating the playback information of the stored base layer data as separate metadata may be included, and the metadata generator may generate separately the metadata and store the metadata in the storage unit 25.

The second decoder 27 may decode the base layer data uploaded from the storage unit 25 and store the decoded base layer data in the second memory 29.

The stream demultiplexer 11 may demultiplex the real-time (RT) data into video, audio and data streams. The video stream may include enhancement layer data of a specific program. The system decoder 13 may decode the video data encapsulated in the video stream and output the video data.

The first decoder 15 may decode enhancement layer data and store the decoded enhancement layer data in the first memory 19.

The video combiner 17 may decode the enhancement layer data and the base layer data respectively stored in the first memory 19 and the second memory 29 together and output a high-quality video signal according to inter-layer prediction.

The video combiner 17 may decode the base layer data and the enhancement layer data included in a program using a specific program identifier in the layer data descriptor. The apparatus for receiving the broadcasting signal may identify the non real-time (NRT) data and the real-time (RT) data using a service type of the layer data descriptor, and identify the base layer data and the enhancement data using a layer type.

In FIG. 22, the base layer data information transmitted in non real-time (NRT) is stored in the receiver in advance, and the enhancement layer data transmitted in real-time (RT) is combined with the stored base layer data, thereby outputting high-quality data. That is, since only the enhancement layer data is transmitted in real-time (RT), a receiver capable of processing only the base layer data or a user who is authorized to view only the base layer data cannot process or play back the real-time (RT) broadcast stream. In the embodiment of FIG. 22, only an authorized user can normally view a program and a unauthorized user cannot view the program.

Figure 23:
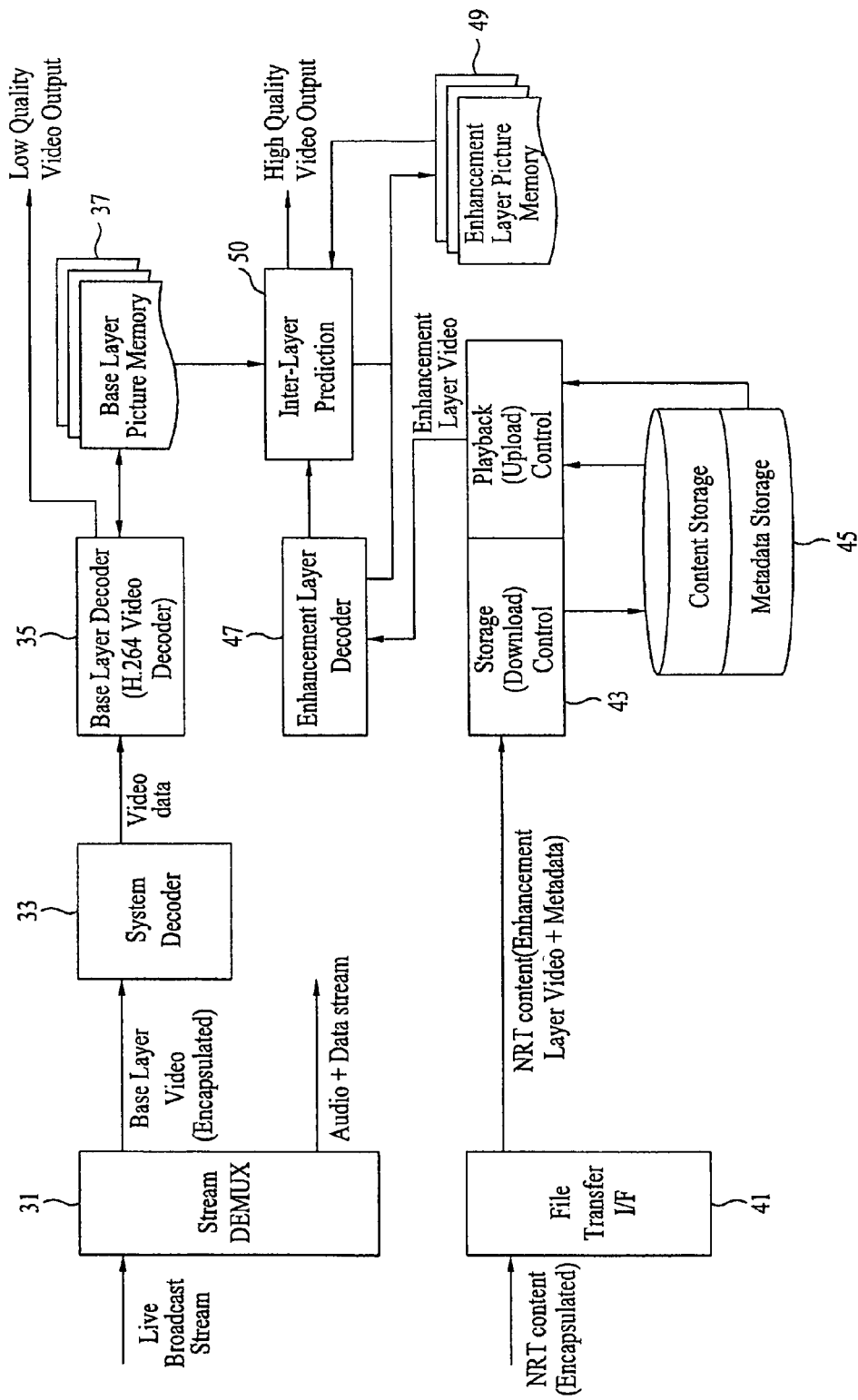
FIG. 23 is a view showing an apparatus for receiving a broadcasting signal according to another embodiment of the present invention.

FIG. 23 is a view showing an apparatus for receiving a broadcasting signal according to another embodiment of the present invention. The apparatus for receiving the broadcasting signal may receive enhancement layer data in non real-time (NRT), receive base layer data in real-time (RT), decode the two pieces of layer data together, and output a high-quality video signal.

The apparatus for receiving the broadcasting signal according to the embodiment of the present invention includes a stream demultiplexer 31, a system decoder 33, a first decoder 35, a first memory 37, a file filter 41, a storage control unit 43, a storage unit 45, a second decoder 47, a second memory 49 and a video combiner 50.

The stream demultiplexer 31, the system decoder 33, the first decoder 35 and the first memory 37 may process real-time (RT) data, and the file filter 41, the storage control unit 43, the storage unit 45, the second decoder 47 and the second memory 49 may process non real-time (NRT) data.

The apparatus for receiving the broadcasting signal according to the embodiment of the present invention may receive a table section including an NRT descriptor or layer data descriptor before non real-time (NRT) data is received, and obtain information about non real-time (NRT) data including the reception time of the non real-time (NRT) data in advance.

The file filter 41 may filter a file including non real-time (NRT) data. The non real-time (NRT) data file may be a file in which enhancement layer data, audio data and metadata of the enhancement layer data are encapsulated. The metadata may include playback information of the non real-time (NRT) data as described above.

The storage control unit 43 may store the received non real-time (NRT) data file in the storage unit 45, and store the non real-time (NRT) data file using the layer data descriptor or the metadata. Similarly, in this embodiment, a metadata generator for generating the playback information of the enhancement layer data as separate metadata may be included. The metadata generator may generate separately the metadata and store the metadata in the storage unit 45.

The second decoder 47 may decode the enhancement layer data uploaded from the storage unit 45 and store the decoded enhancement layer data in the second memory 49.

The stream demultiplexer 31 may demultiplex real-time (RT) data into video, audio and data streams. The video stream may include base layer data of a specific program. The system decoder 33 may decode the video data encapsulated in the video stream and output the video data.

The first decoder 35 may decode base layer data and store the decoded base layer data in the first memory 37.

The video combiner 50 may decode the base layer data and the enhancement layer data respectively stored in the first memory 37 and the second memory 49 together, and output a high-quality video signal according to inter-layer prediction.

In FIG. 2-3, since the base layer data information is transmitted in real-time (RT), a user who is not authorized to view the enhancement layer data can view a program including only the base layer data, but cannot play back or view high-quality data because the enhancement layer data cannot be received and processed.

In the embodiments of FIGS. 22 and 23, the video combiners 17 and 50 may use the picture number of a video elementary stream in order to perform synchronization of two video layers. However, in this case, the first decoders 15 and 35 and the second decoders 27 and 47 temporarily store the base layer data or the enhancement layer data in a buffer. The picture number may be allocated in the unit of frames or fields and the decoding or the display of the video signal may be performed according to the picture number.

The video/audio data may be transmitted in a state of being encapsulated in the transport packet of the video/audio data. If the video/audio data is synchronized and output in an encapsulation layer level, the decoding or the display of the video signal may be performed according to the picture number allocated to the IP, the UDP or the RTP packet level.

The storage control units 23 and 43 may upload the base layer (or enhancement layer) data having a picture number corresponding to the picture number of the encapsulated enhancement layer (or base layer) data received in real-time (RT). The video combiners 17 and 50 may combine the enhancement layer (base layer) data and the base layer (enhancement layer) data based on the picture number and synchronize the two pieces of layer data transmitted separately. The storage control units 23 and 43 include the respective buffers and respectively upload the base layer (enhancement layer) data having the necessary picture numbers from the storage units 25 and 45 in advance. The uploaded data may be output to the first decoder or the second decoder.

Figure 24:
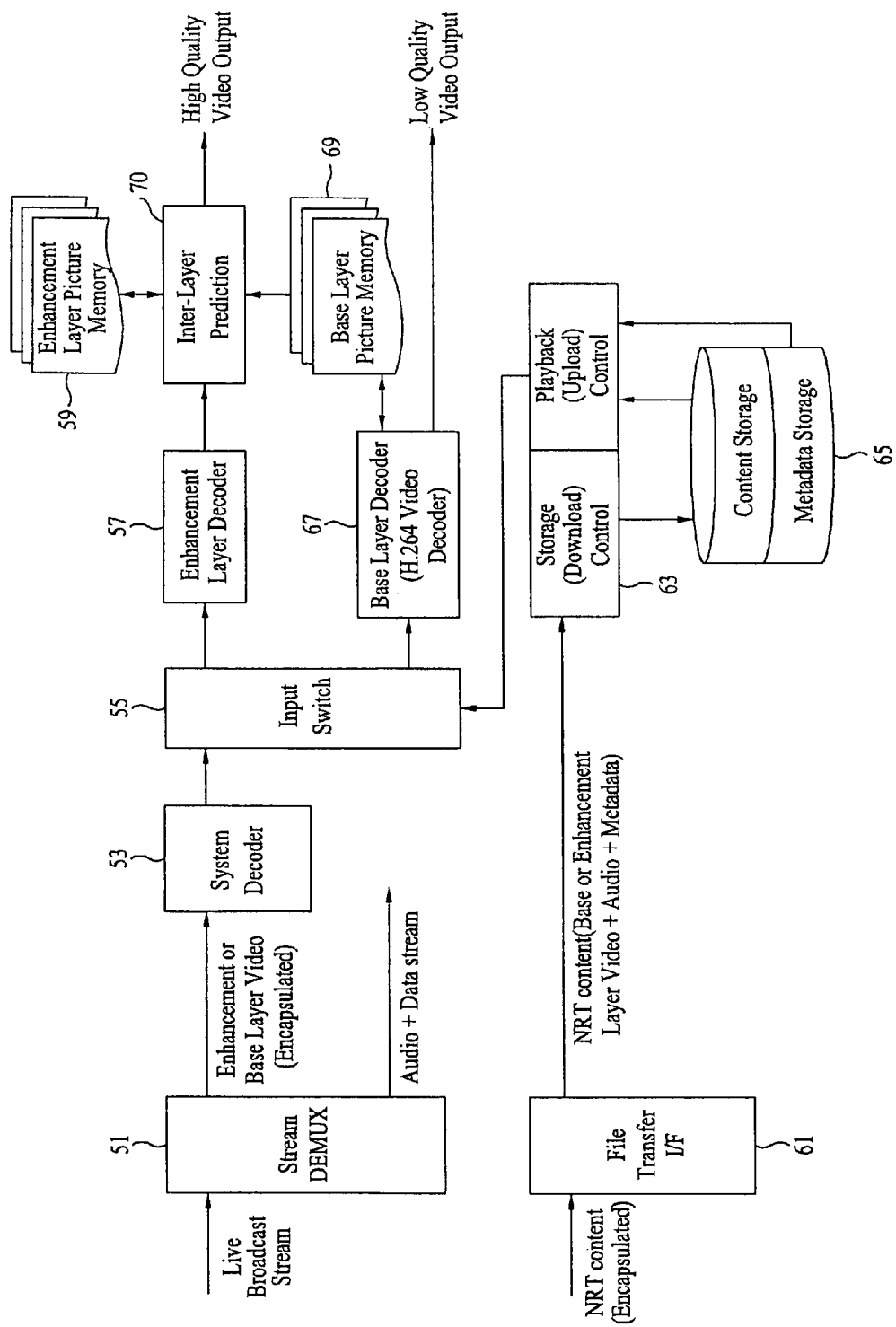
FIG. 24 is a view showing an apparatus for receiving a broadcasting signal according to another embodiment of the present invention.

FIG. 24 is a view showing an apparatus for receiving a broadcasting signal according to another embodiment of the present invention. The apparatus for receiving the broadcasting signal according to the embodiment of the present invention includes a stream demultiplexer 51, a system decoder 53, an input switch 55, a first decoder 57, a first memory 59, a file filter 61, a storage control unit 63, a storage unit 65, a second decoder 67, a second memory 69, and a video combiner 70.

The apparatus for receiving the broadcasting signal according to the present embodiment is similar to the above-described embodiments, except that the input switch 55 obtains identification information indicating whether the data transmitted in real-time (RT) or non real-time (NRT) is base layer data or enhancement layer data and outputs necessary data to each of the decoders according to the identification information.

The stream demultiplexer 51, the system decoder 53, the first decoder 57 and the first memory 59 may process the enhancement layer data, and the file filter 61, the storage control unit 63, the storage unit 65, the second decoder 67, the second memory 69 and the video combiner 70 may process the base layer data.

The apparatus for receiving the broadcasting signal may receive a table section including an NRT descriptor or layer data descriptor before data is received in non real-time (NRT), and obtain information about non real-time (NRT) data including the reception time of the non real-time (NRT) data in advance.

The file filter 61 may filter a file including non real-time (NRT) data. The non real-time (NRT) data file may be a file in which enhancement layer data and metadata of the enhancement layer data are encapsulated in transport packet. The metadata may include playback information of the non real-time (NRT) data. The metadata may be extracted from the encapsulated file and be stored in a metadata storage unit of the storage unit 65.

The storage control unit 63 may store the received non real-time (NRT) data file in the storage unit 65, and store the non real-time (NRT) data file using the layer data descriptor or the metadata.

The storage control unit 63 may output the non real-time (NRT) data stored in the storage unit 65 to the input switch 55.

The stream demultiplexer 51 may demultiplex the data transmitted in real-time (RT) into video, audio and data streams. The video stream may include base layer data of a specific program. The system decoder 53 may decode the video data encapsulated in the transport packet of the video stream and output the video data to the input switch 55.

The input switch 55 may identify the base layer data decoded by the system decoder 53 or the enhancement layer data uploaded by the storage control unit 63 and respectively output the data to the first decoder 57 and the second decoder 67. The input switch 55 may obtain the base/enhancement layer data information included in the layer data descriptor, the NRT descriptor or the associated data descriptor. The information included in the layer data descriptor, the NRT descriptor or the associated data descriptor was described above.

The first decoder 57 may decode the enhancement layer data and store the decoded enhancement layer data in the first memory 59.

The second decoder 67 may decode the base layer data and store the decoded base layer data in the second memory 69.

The video combiner 70 may decode the enhancement layer data and the base respectively stored in the first memory 59 and the second memory 69 together and output a high-quality video signal according to inter-layer prediction.

The video combiner 70 may decode the base layer data and the enhancement layer data included in a program using a specific program identifier in the layer data descriptor. The apparatus for receiving the broadcasting signal may identify the non real-time (NRT) data and the real-time (RT) data using a service type of the layer data descriptor, and identify the base layer data and the enhancement data using a layer type.

The enhancement layer data may be stored according to the storage permission information in the layer data descriptor. The descriptor including the storage permission information is shown in FIG. 8.

If the storage of the enhancement layer data is permitted, the enhancement layer data may be combined with the base layer data transmitted in real-time (RT) and high-quality video data may be output. If the storage is permitted, the storage may be limited by a predetermined number or a predetermined time or permanent storage may be permitted. Alternatively, temporary storage may be permitted only for a specific function such as a time-shift function.

If the storage of the enhancement layer data is not permitted, low-quality contents including only the base layer data are output.

Figure 25:
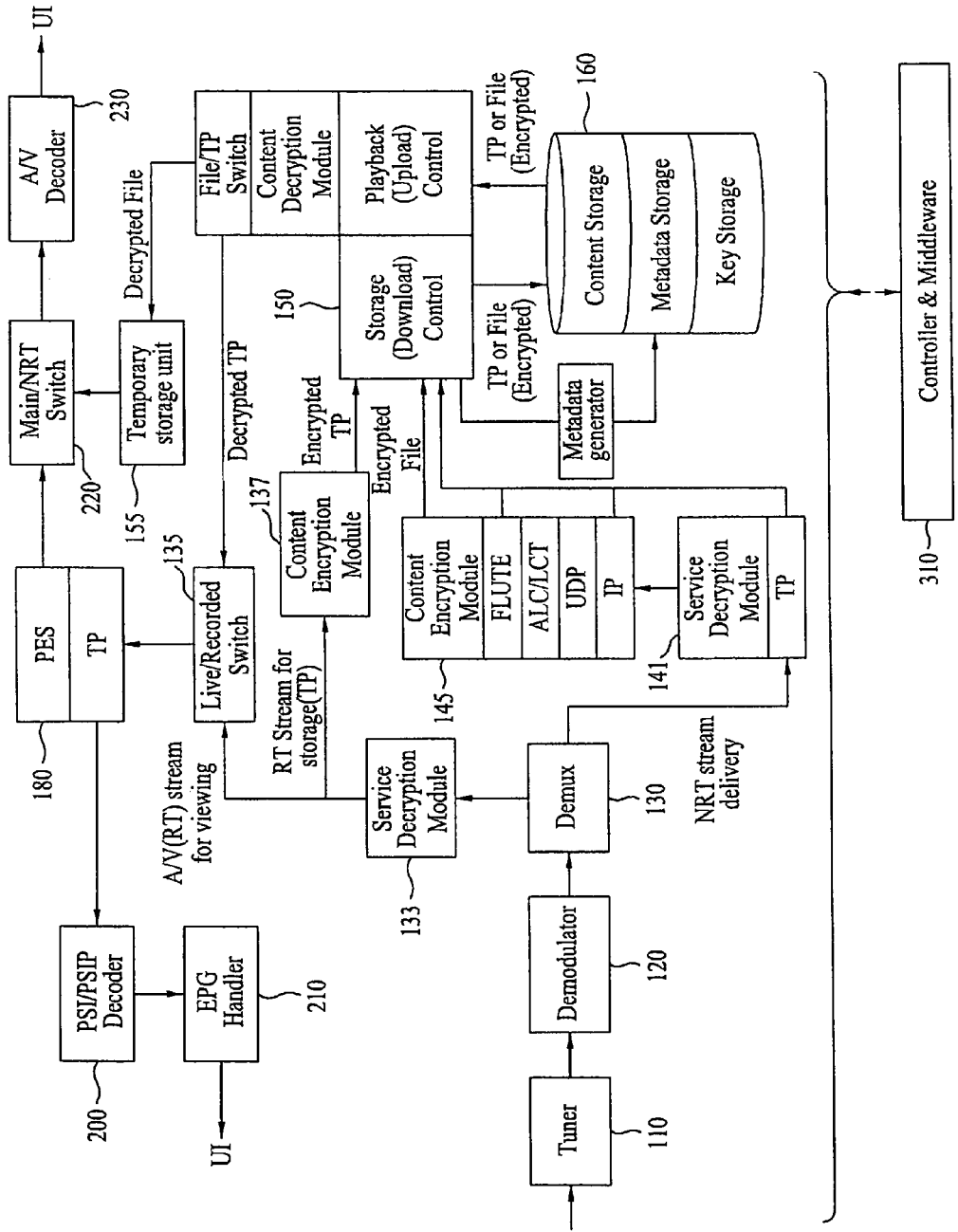
FIG. 25 is a view showing an apparatus for receiving a broadcasting signal according to another embodiment of the present invention.

FIG. 25 is a view showing an apparatus for receiving a broadcasting signal according to another embodiment of the present invention. The apparatus for receiving the broadcasting signal according to the present embodiment may decode information about the file attribute of FIG. 18 and determine whether or not the file decoded from the information about the file attribute is played back by the apparatus for receiving the broadcasting signal.

The apparatus for receiving the broadcasting signal includes a reception unit 110, a demodulator 120, a demultiplexer 130, a service decoding module 133, a first switch 135, a content decoding module 137, a first signal parser 141, a second signal parser 145, a storage control unit 150, a temporary storage unit 155, a storage unit 160, a packet processor 180, a broadcasting descriptor decoder 200, a broadcasting information handler 210, a second switch 220, an audio/video (A/V) decoder 230 and a control unit 310.

The reception unit 110 may receive, for example, a terrestrial broadcasting signal and tune to a desired channel of the broadcasting signal. The reception unit 110 may receive a real-time (RT) stream and an non real-time (NRT) stream.

The demodulator 120 demodulates the received broadcasting signal of the channel and performs a Vestigial Side Band (VSB) demodulating process if the broadcasting signal is a VSB modulation signal.

The demultiplexer 130 may demultiplex the broadcasting signal into a real-time (RT) stream and an non real-time (NRT) stream. For example, the demultiplexer 130 may demultiplex the broadcasting signal into the real-time (RT) stream and the non real-time (NRT) stream according to a PID.

The contents transmitted in non real-time (NRT) may be transmitted in the form of a transport packet (TP), an IP packet or a file included in the packet.

The first signal parser 141 may decode a transport file including the contents transmitted in non real-time (NRT). The first signal parser 141 may obtain metadata of the non real-time (NRT) file included in the TP. For example, the TP may be parsed according to the ISO/IEC 13818-6 DSM-CC. If the packet for transmitting the non real-time (NRT) data is encrypted by a service encryption algorithm, the first signal parser 141 may decode the non real-time (NRT) data included in the packet. For example, it is determined whether encryption is performed according to a service protection flag of the file attribute descriptor shown in FIG. 18, and the first signal parser 141 may perform a service decryption algorithm in the TP file according to the file attribute descriptor.

The second signal parser 145 may decode the non real-time (NRT) contents or metadata included in the IP packet. Alternatively, the second signal parser 145 may decode a content file object or metadata included in the IP packet. For example, the IP packet may be included in the TP according to ATSC A/90 or A/92. Alternatively, the second signal parser 145 may decode non real-time (NRT) contents or metadata having the format of the file included in the TP. The content file object may be encapsulated by UDP, Asynchronous Layered Coding (ALC)/Layered Coding Transport (LCT) and FLUTE according to RFC3926. The second signal parser 145 may decapsulate the encapsulated file object.

The content encryption module of the second signal parser 145 may encrypt the decapsulated file and transmit the encrypted file to the storage control unit 150 such that the encrypted file is stored in the storage unit 160. The content encryption module may obtain encryption information of the contents of the obtained file object according to the file attribute descriptor of the layer data, encrypt the contents according to the information, and output the encrypted contents.

The demultiplexer 130 demultiplexes a real-time (RT) stream. The service decoding module 133 may decode the encrypted base layer (or enhancement layer) data according to the file attribute descriptor if the real-time (RT) stream is encrypted.

The decoded real-time (RT) stream is sent to the content encryption module 137 or transmitted to the first switch 135.

The content encryption module of the second signal processor 145 or the content encryption module 137 may encrypt the contents according to the file attribute descriptor.

The storage control unit 150 may store the contents delivered in real-time (RT) in the storage unit 160, store the contents delivered in non real-time (NRT), or upload the stored contents. The storage control unit 150 may receive the TP from the first signal processor 141 or receive a file of the IP packet or the FLUTE session from the second signal processor 145. The TP, the IP packet or the FLUTE session may include the contents transmitted in non real-time (NRT).

The storage control unit 150 may include a download control unit for controlling the download of the contents in the storage unit 160 and an upload control unit for playing back the contents stored in the storage unit 160. The download control unit may receive the encrypted file from the content encryption module of the second signal processor 145 or store the transport stream encrypted by the content encryption module 137 for encrypting the real-time (RT) stream in the storage unit 160.

The upload control unit of the storage control unit 150 may include a switch for playing back the stored file or the packet. The storage control unit 150 may implement a personal video recorder (PVR) function and store metadata of the non real-time (NRT) data generated by the metadata generator. Alternatively, the storage unit 150 may store the metadata included in the PT, the IP packet, or the file transmitted by the broadcasting signal. The upload control unit of the storage control unit 150 may decode the contents according to the file attribute descriptor of the file or the packet if the contents delivered by the uploaded packet or file are encrypted.

The storage control unit 150 may store, may temporarily store or may not store the non real-time (NRT) data according to the storage permission information of the non real-time (NRT) data decoded by the broadcasting descriptor decoder 200.

The storage control unit 150 switches the uploaded file or packet such that the decoded file is delivered to the second switch 220 and the decoded packet is delivered to the first switch 135.

The storage unit 160 may store contents transmitted in non real-time (NRT), metadata describing the playback time point of the contents, and a decryption key transmitted in non real-time (NRT) or real-time (RT).

The first switch 135 selectively outputs the packet transmitted in real-time (RT) or the packet uploaded from the storage unit 160 although not shown in the figure.

The packet processor 180 may divide the broadcasting descriptor such as the PSI/PSIP from the TP and reconfigure the TP by a packetized elementary stream (PES). The packet processor 180 outputs a PSIP table section or layer data descriptor including an NRT descriptor, an associated data descriptor, and file attribute descriptor to the broadcasting descriptor decoder 200.

The broadcasting descriptor decoder 200 may decode information indicating whether or not the received layer data or file is coded or encrypted by an algorithm capable of decoding the data or file by the apparatus for receiving the broadcasting signal according to the file attribute information shown in FIG. 18. The apparatus for receiving the broadcasting signal may determine that only media or the components of the media coded by the algorithm capable of processing the media are decoded and the remaining data is not processed, by the decoded information. The service decoding module 133, the service decoding module of the first signal processor, the content encryption module of the second signal processor 145, the content encryption module 137 and the content decoding module of the storage control unit 150 may encrypt and decrypt the data by the encryption or decryption algorithm included in the file attribute descriptor decoded by the broadcasting descriptor decoder 200.

The broadcasting descriptor decoder 200 decodes the PSIP table section or the layer data descriptor, and outputs event information including the schedule information of the broadcasting descriptor to the broadcasting information handler 210. The broadcasting information handler 210 may collect the event information of the broadcasting signal and provide the broadcasting information including the event information to a user.

For example, the broadcasting descriptor decoder 200 may parse the program descriptor including information indicating whether or not data transmitted in non real-time (NRT) is stored in FIG. 7, the layer data descriptor of FIG. 15, the NRT descriptor of FIG. 16, the associated data descriptor of FIG. 17 and the file attribute descriptor of FIG. 18.

The file uploaded by the storage control unit 150 is stored in the temporary storage unit 155 and is output to the second switch 220.

The temporary storage unit 155 may temporarily store the contents transmitted in non real-time (NRT) in order to facilitate the uploading of the contents. In particular, the temporary storage unit 155 may cache the non real-time (NRT) contents by referring to the layer data descriptor, the NRT descriptor or the associated data descriptor, in consideration of the case where the contents transmitted in non real-time (NRT) are uploaded from the storage unit 160 without a sufficient time redundancy.

The second switch 220 may selectively output the non real-time (NRT) content file uploaded by the storage control unit 150 or the packet output from the file processor 180. For example, the second switch 220 may continuously output the base layer data and enhancement layer data associated with each other such that the base layer data and the enhancement layer data are combined using the layer data descriptor, the NRT descriptor or the associated data descriptor.

The A/V decoder 230 may decode the A/V data included in the stream or the file selectively output from the second switch 220, and output the decoded A/V data. For example, the A/V decoder 230 may decode the base layer (enhancement layer) data transmitted in real-time (RT) and the enhancement layer (base layer) data transmitted in non real-time (NRT) together, and output high-quality video/audio data.

The control unit 310 may control the component blocks of the apparatus for receiving the broadcasting signal and drive middleware for providing a broadcasting service. The control unit 310 may control the high-quality contents transmitted in real-time (RT) or non real-time (NRT) to be output according to the program descriptor of FIG. 7, the layer data descriptor of FIG. 15, the NRT descriptor of FIG. 16, the associated data descriptor of FIG. 17 and the file attribute descriptor of FIG. 18 decoded by the broadcasting descriptor decoder 200.

According to the embodiments of the present invention, high-quality contents may or may not be played back depending on whether or not a portion of data of contents transmitted in non real-time (NRT) is stored.

According to the embodiments of the present invention, information describing base layer data or enhancement layer data transmitted in non real-time (NRT) and real-time (RT) data associated therewith may be described.

According to the embodiments of the present invention, non real-time (NRT) data and real-time (RT) data associated therewith may be combined and thus only an authorized user can obtain high-quality contents.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of receiving a broadcasting signal in an apparatus for receiving the broadcasting signal, the method comprising:
receiving a first encoding data descriptor describing first encoding data included in contents in non-real time, wherein the contents further includes second encoding data;
receiving the first encoding data in non-real time according to the first encoding data descriptor; and
decoding the first encoding data received in non-real time and the second encoding data received in real time together, according to the first encoding data descriptor, and outputting the contents,
wherein the first encoding data descriptor includes storage permission information of the first encoding data,
wherein the storage permission information is any one of information indicating that the storage of the first encoding data is not permitted, information indicating that the temporary storage for a time-shift function of the first encoding data is permitted, information indicating that the storage of the first encoding data is permitted during a limited time, information indicating that the storage of the first encoding data is permitted by a limited number of playback events, and information indicating that the permanent storage of the first encoding data is permitted,
wherein the first encoding data descriptor includes an identifier of a channel for receiving the first encoding data, a program identifier, and an identifier of the second encoding data.

2. The method according to claim 1, wherein the first encoding data descriptor includes a reception start time of the first encoding data and a reception end time of the first encoding data.

3. The method according to claim 2, wherein the first encoding data descriptor further includes a file attribute descriptor describing an encoding scheme of the first encoding data.

4. The method according to claim 3, wherein the file attribute descriptor includes a media type of the first encoding data, a component type of the media, a codec type of the first encoding data, and information indicating whether or not the first encoding data is encrypted.

5. The method according to claim 2, wherein the first encoding data descriptor further includes an identifier of the first encoding data, location information capable of receiving the first encoding data, and the second encoding data descriptor.

6. The method according to claim 5, wherein the second encoding data descriptor further includes channel information capable of receiving the second encoding data, a reception start time of the second encoding data and a reception end time of the second encoding data.

7. The method according to claim 1, wherein the first encoding data is enhancement layer data according to scalable video coding (SVC) scheme, and the second encoding data is base layer data according to the scalable video coding (SVC) scheme.

8. An apparatus for receiving a broadcasting signal, the apparatus comprising: a reception unit configured to receive a first encoding data descriptor describing first encoding data included in contents and the first encoding data corresponding to the first encoding data descriptor in non-real time, wherein the contents further includes second encoding data and the reception unit is further configured to receive the second encoding data in real time;
a broadcasting descriptor decoder configured to decode the received first encoding data descriptor; and
a control unit configured to decode the first encoding data and the second encoding data according to the decoded first encoding data descriptor, combine the decoded first encoding data and second encoding data, and output the contents,
wherein the first encoding data descriptor includes storage permission information of the received first encoding data, and wherein the apparatus for receiving the broadcasting signal further includes a storage unit storing the first encoding data according to the storage permission information, wherein the storage permission information is any one of information indicating that the storage of the first encoding data is not permitted, information indicating that the temporary storage for a time-shift function of the first encoding data is permitted, information indicating that the storage of the first encoding data is permitted during a limited time, information indicating that the storage of the first encoding data is permitted by a limited number of playback events, and information indicating that the permanent storage of the first encoding data is permitted, wherein the first encoding data descriptor includes an identifier of a channel for receiving the first encoding data, a program identifier, and an identifier of the second encoding data.

9. The method according to claim 8, wherein the first encoding data descriptor includes a reception start time of the first encoding data and a reception end time of the first encoding data.

10. The apparatus according to claim 9, wherein the first encoding data descriptor further includes a file attribute descriptor describing an encoding scheme of the first encoding data.

11. The apparatus according to claim 10, wherein the file attribute descriptor includes a media type of the first encoding data, a component type of the media, a codec type of the first encoding data, and information indicating whether or not the first encoding data is encrypted.

12. The apparatus according to claim 9, wherein the first encoding data descriptor further includes an identifier of the first encoding data, location information capable of receiving the first encoding data, and the second encoding data descriptor.

13. The apparatus according to claim 12, wherein the second encoding data descriptor further includes channel information capable of receiving the second encoding data, a reception start time of the second encoding data and a reception end time of the second encoding data.

14. The apparatus according to claim 8, wherein the first encoding data is enhancement layer data according to scalable video coding (SVC) scheme, and the second encoding data is base layer data according to the scalable video coding (SVC) scheme.

* * * * *